US010380526B2

(12) United States Patent
Damonte et al.

(10) Patent No.: US 10,380,526 B2
(45) Date of Patent: Aug. 13, 2019

(54) SYSTEM AND METHOD FOR PROVIDING A PROCESS PLAYER FOR USE WITH A BUSINESS PROCESS DESIGN ENVIRONMENT

(71) Applicant: ORACLE INTERNATIONAL CORPORATION, Redwood City, CA (US)

(72) Inventors: Nicolas Damonte, Buenos Aires (AR); Ariel Cohen, Buenos Aires (AR); Pablo Hadziatanasiu, Buenos Aires (AR); Steven Mayze, Erlangen (DE); Patricio Barletta, Buenos Aires (AR); Yogeshwar Kuntawar, Union City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 278 days.

(21) Appl. No.: 14/184,544

(22) Filed: Feb. 19, 2014

(65) Prior Publication Data
US 2015/0066573 A1 Mar. 5, 2015

Related U.S. Application Data

(60) Provisional application No. 61/873,263, filed on Sep. 3, 2013.

(51) Int. Cl.
*G06Q 10/00* (2012.01)
*G06Q 10/06* (2012.01)

(52) U.S. Cl.
CPC .............. *G06Q 10/06316* (2013.01)

(58) Field of Classification Search
CPC .............. G06Q 10/00; G06Q 50/00
See application file for complete search history.

(56) References Cited

U.S. PATENT DOCUMENTS

| 2007/0021955 | A1* | 1/2007 | Tolone | G06F 17/5004 703/22 |
| 2008/0120574 | A1* | 5/2008 | Heredia | G06Q 10/06 715/835 |
| 2010/0095276 | A1* | 4/2010 | Ottavi | G06F 11/3672 717/125 |
| 2010/0138360 | A1* | 6/2010 | Cutler | G06F 3/0481 705/36 R |
| 2010/0262901 | A1* | 10/2010 | DiSalvo | G06Q 40/04 715/227 |
| 2012/0130703 | A1* | 5/2012 | Cutts | G06F 17/5009 703/22 |

* cited by examiner

*Primary Examiner* — Alan S Miller
*Assistant Examiner* — Arif Ullah
(74) *Attorney, Agent, or Firm* — Tucker Ellis LLP

(57) ABSTRACT

A system and method for providing a process player for use with a business process design environment. In accordance with an embodiment, a user can select, configure, and play an instance of a business process being developed in the design environment. During play of a selected business process instance the user can configure and play interactive activities of the selected instance. For example, the user can walk through an instance of the business process, while impersonating different users or roles in its interactive activities.

19 Claims, 26 Drawing Sheets

SYSTEM AND METHOD FOR PROVIDING A PROCESS PLAYER FOR USE WITH A BUSINESS PROCESS DESIGN ENVIRONMENT

CLAIM OF PRIORITY

This application claims the benefit of priority to U.S. Provisional Patent Application No. 61/873,263, titled "SYSTEM AND METHOD FOR PROVIDING A PROCESS PLAYER FOR USE WITH A BUSINESS PROCESS DESIGN ENVIRONMENT", filed Sep. 3, 2013, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software tools for creating and/or improving business processes, and are particularly related to systems and methods for providing a process player for use with a business process design environment to simulate a business process.

BACKGROUND

Business processes are collections of related, structured activities or tasks that produce a specific service or product, or serve a particular goal for a particular customer or customers, including customers internal and external to an organization. A business process can be visualized with a flowchart as a sequence of activities with interleaving decision points that can be resolved with rules based on the data in the process. Business processes are often modeled to test newly developed business processes or to improve process efficiency and quality of an existing business process. Process analysts are responsible for creating the initial flow of a business process and documenting its steps. This also includes identifying and defining the key performance indicators (KPIs) and high level rules that define the routing artifacts of the business process. Process analysts can benefit from the use of business process models to perform simulations to calculate and estimate return on investment (ROI).

Currently available business process modeling functionality allows for pre-execution scenario modeling followed by simulation. Post-execution optimization is available based on the analysis of instances of the simulation that produce performance metrics. To model a business process, the business process is first created using a composition tool. Scenarios are defined using different rules and sample data, and the created business process is deployed to a runtime environment. The composition tool is then set aside and a simulation tool is used to execute the simulation based on the scenarios. The results of the simulation are then analyzed to determine performance. Current methods for creating business process models and simulating the created models can be slow and cumbersome, requiring a process analyst to manage different tools that do not interact with each other within their environments, but which rely on their separately generated work products.

SUMMARY

In accordance with an embodiment, a system for composing business processes operable on one or more microprocessors, comprises a business process design environment including an interactive workspace configured to allow a business process to be created by using graphical elements and a process player configured to allow the business process to be simulated within the interactive workspace by a user to generate an instance. The process player is configured to prompt the user to set a condition during a simulation at a point in the business process where a participant is designed to be engaged with the business process.

In some embodiments the process player is configured to allow the business process to be simulated multiple different times to generate multiple different instances. In such embodiments one or more conditions can vary between the multiple different instances. In some embodiments, conditions are settable by one or both of selecting an option from a menu and entering information into a form.

In some embodiments, the business process design environment includes a test environment from where the business process is accessible. The multiple different instances of the business process can be saved and accessed by the user from the test environment. In some embodiments, multiple different business processes are accessible from the test environment.

In some embodiments, the business process design environment provides access by the process player, to the business process design environment, through an application programming interface (API) that enables one or more instances of the business process to be run within the process player to simulate the business process.

In accordance with another embodiment, a method for simulating a business process, comprises providing a business process design environment including an interactive workspace configured to allow a business process to be created by using graphical elements and providing a process player configured to allow the business process to be simulated within the interactive workspace by a user to generate an instance. The process player is configured to prompt the user to set a condition during a simulation at a point in the business process where a participant is designed to be engaged with the business process.

In some embodiments, the method comprises receiving, from a developer, a plurality of components graphically represented in the interactive workspace so that a business process is created. In such embodiments, one or more roles are assigned to one or more of the components, the one or more roles requiring action on the part of a participant.

In some embodiments, the method comprises receiving, from a user within the interactive workspace, an instruction to simulate a business process, using the process player to simulate the business process to thereby generate an instance, and visually communicating, via the process player within the interactive workspace, each process step in the business process. An instance can be generated and stored based on the simulation of the business process.

In some embodiments, the method comprises prompting, via the process player, the user to set a condition during the simulation at a point in the business process where a participant is designed to be engaged with the business process.

In accordance with another embodiment, a non-transitory computer readable medium includes instructions stored thereon which when read and executed by one or more computers cause the one or more computers to perform a series of steps. The steps comprise providing a business process design environment including an interactive workspace configured to allow a business process to be created by using graphical elements and providing a process player configured to allow the business process to be simulated within the interactive workspace by a user to generate an instance. The process player is configured to prompt the user to set a condition during a simulation at a point in the business process where a participant is designed to be engaged with the business process.

In some embodiments, the instructions, when read and executed by one or more computers cause the one or more computers to perform the further steps comprising receiving, from a developer, a plurality of components graphically represented in the interactive workspace so that a business process is created. One or more roles are assigned to one or more of the components, the one or more roles requiring action on the part of a participant.

In some embodiments, the instructions, when read and executed by one or more computers cause the one or more computers to perform the further steps comprising receiving, from a user within the interactive workspace, an instruction to simulate a business process, using the process player to simulate the business process to thereby generate an instance, and visually communicating, via the process player within the interactive workspace, each process step in the business process. The steps can further comprise generating and storing an instance based on the simulation of the business process.

In some embodiments, the instructions, when read and executed by one or more computers cause the one or more computers to perform the further steps comprising prompting, via the process player, the user to set a condition during the simulation at a point in the business process where a participant is designed to be engaged with the business process.

DETAILED DESCRIPTION

The development of business processes is an important aspect of many enterprise computing environments. Products such as ORACLE® Business Process Composer, a component of ORACLE® Business Process Management (BPM) Suite, provide tools for a developer to create business process models based on standards. Such products can include support for project templates, support for process blueprints that can be associated with implementations, and support for business rules and policies that allow runtime modification without the need to redeploy running applications.

Embodiments of systems and methods in accordance with the present invention are usable with and can include such existing tools and environments to improve and/or streamline the ability of a user, such as a process analyst, to create and refine and/or improve business processes. In accordance with an embodiment, a process player is provided for use with a business process design environment. The process player can allow a user to select, configure, and play an instance of a business process model being created in the business process design environment. During play, the user can configure and play interactive activities (also referred to herein as setting conditions) at process steps where a participant is designed to be engaged with the business process. For example, the user can walk through an instance of the business process while impersonating different users or performing different roles in interactive activities.

Playing an interactive activity can include presenting to a user a task form associated with a process step. A task form can include a menu of selectable options. For example, the user can be provided the option of approving or rejecting a request. Further, the interactive activity can allow the user to select a member of a role to act on the process step. As another example, an interactive activity can include presenting to a user a fillable form into which the user can enter data. As another example, in accordance with an embodiment, the process player can allow the user to skip to a next process step during a business process timer activity, without waiting for actual time outs. This allows the user to update a payload and alter the process flow to see different execution flows.

Figure 1:
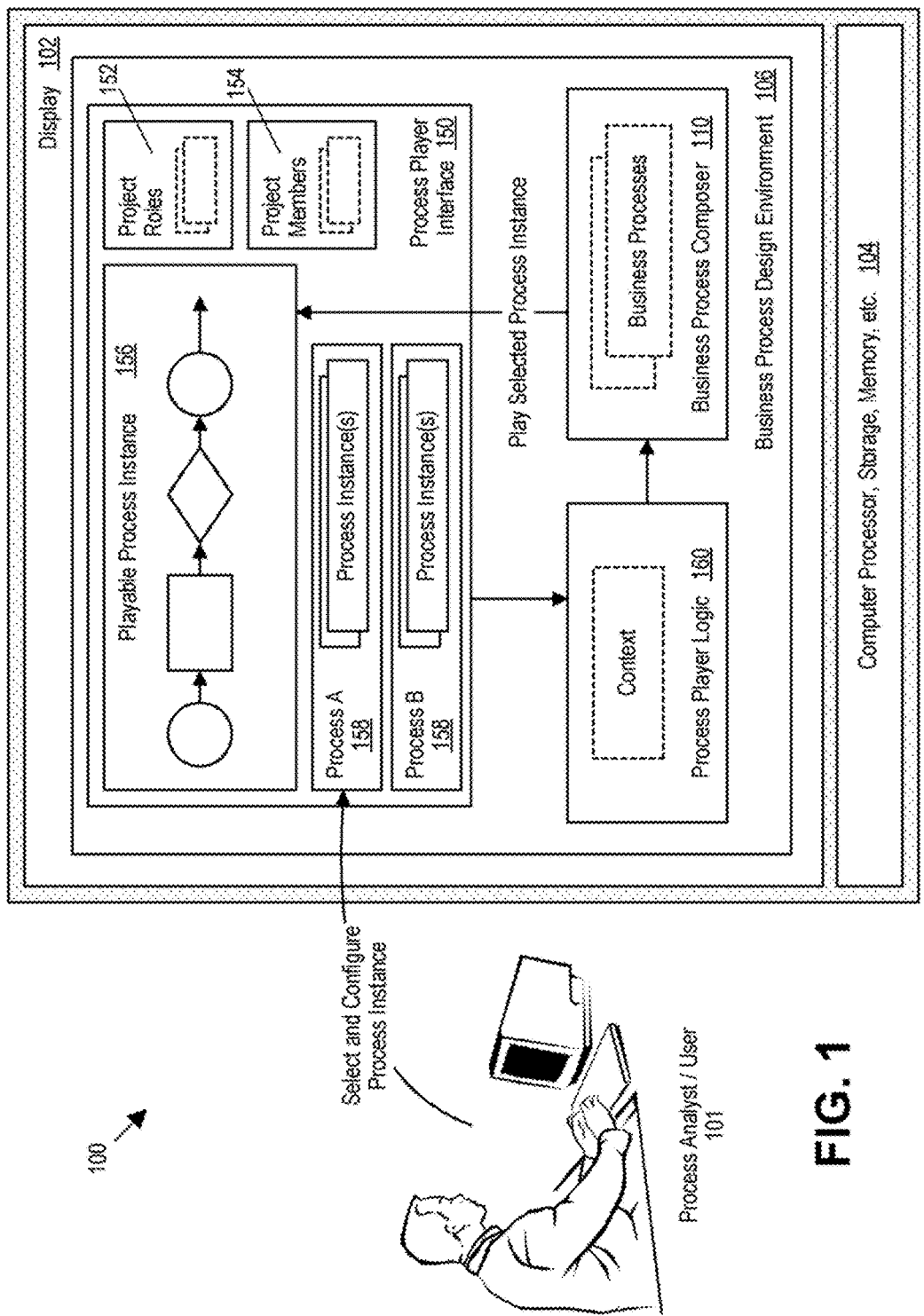
FIG. 1 illustrates a system for composing business processes including a process player deployable within a business process design environment in accordance with an embodiment.

FIG. 1 illustrates a system 100 that comprises a process player 150 for use with a business process design environment 106 (also referred to herein as a design environment), in accordance with an embodiment. A user 101, such as a process analyst, can interact with the system 100 to incrementally develop and validate business processes. In a typical configuration, the user 101 will launch the design environment 106 so that the business process design environment 106 is presented to the user 101 on a display 102. The display 102 can be a component of a computer environment 104, such as a laptop computer, a desktop computer, a tablet, or some other device having local hardware such as a processor, storage, and memory, a terminal accessing remote hardware, or some combination of local and remote hardware. The user 101 can access the design environment 106 using a keyboard/mouse combination, using a pen and touch tablet, using a touchscreen of the display, or using any other input device that allows interaction with the design environment 106. Further, the design environment 106 can be launched from a website and hosted remotely from the user 101. Alternatively, the design environment 106 can be launched locally using software installed in the computer environment 104 and accessed by the user 101, or the business design environment 106 can be launched using a combination of remote and local software.

The design environment 106 can comprise a product such as Business Process Composer ("Composer") offered by ORACLE® Corporation that can be used to create and customize business processes for use in an enterprise computing environment. However, embodiments of the invention can also be used with other design environments that allow a user to create and customize business processes. In accordance with an embodiment, the process player is associated with a process player interface 150 and process player logic 160. A user 101, for example a process analyst, can select an instance 156 of a business process being developed in the design environment 106 for configuration and play within the process player interface 150. In accordance with an embodiment, the design environment 106 can provide access by the process player to the design environment 106 through an application programming interface (API) that enables the one or more instances 156 of the business process being developed in the design environment to be run within the process player.

In accordance with an embodiment, the process player interface 150 can provide options for the user 101 to select from one or more processes 158, or one or more instances of a particular process, and display a graphical representation of the selected business process instance 156 which can then be configured and played. The user 101 can also associate project roles 152 and project members 154 with a playable process instance. In accordance with an embodiment, the process player logic 160 creates a context for use with the selected business process instance 156 and the business process design environment 106. When the process instance 156 is played, context information can be provided to the design environment 106, for example using its API, for use in playing the selected process instance 156 within the process player. This enables, for example, the process player to allow the user 101 to walk through an instance 156 of the business process 158, while impersonating different users or roles in its interactive activities.

In accordance with an embodiment, when the process player is run on a business process, it validates the project and deploys a version of the project to the design environment. As the process player subsequently runs through the process, it simulates the runtime behavior of some of the process steps. The process player can pause to allow the user to input a simulated user to be a participant performing the task, and/or prompt for a selected outcome defined for the human task. The range of possible outcomes depending on the configuration for that task. For example, an outcome can include a simple approve/reject. Alternatively or additionally, the task may require data to be entered via a form. For example, if a web form is assigned to a human task, the process player can provide the option of launching the web form or selecting the outcome. If the user elects to launch the web form, the system can deploy the web form and display it in a viewer. In accordance with an embodiment, after selecting an outcome and/or entering data, the process player continues to the next process step of the business process.

In accordance with an embodiment, when the process player reaches a message send event, or a send task within a process, it can perform these tasks automatically. When the process player reaches a timer event within a process, it can pause until the user provides an input (i.e., sets a condition). When the process player reaches a call activity, it can display a "drill-down" to call the child process and create a new instance of the process; similarly when the process player reaches an end event, it can display a "drill-up" to return to the parent process. In accordance with other embodiments, other types of process steps and operations can be supported by the process player.

Figure 2:
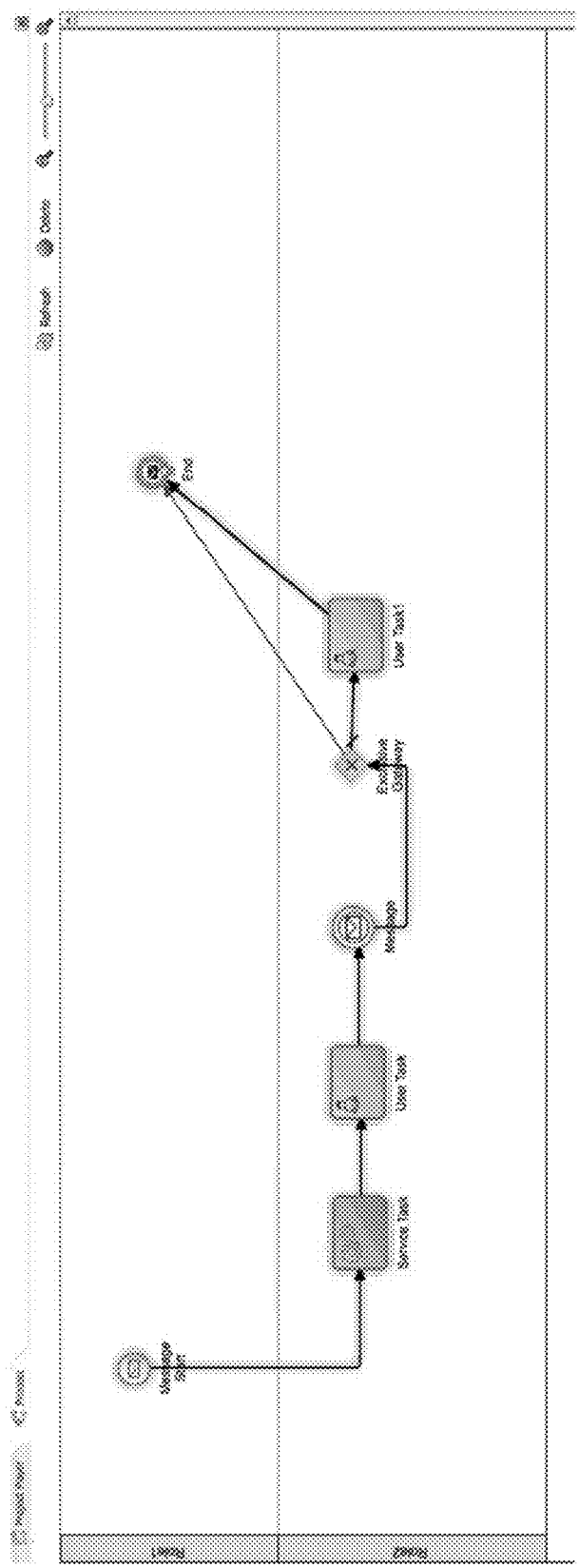
FIG. 2 illustrates an exemplary use of a process player within a business process design environment to simulate a business process, in accordance with an embodiment.

FIG. 2 illustrates an example of a process player simulating a business process model in a design environment, in accordance with an embodiment. A portion of an interactive workspace for creating a business process and playing the business process is shown. In an embodiment, a user can define one or more roles and create process steps by dragging graphical representations of the process steps (also referred to herein as flow objects) into swim lanes 202, 204 associated with the roles that execute the process steps. The user can drag flow arrows to connect flow objects in their order of execution. Alternatively, the user can define process steps using some other technique, for example using pull down menus or keyboard shortcuts.

Process steps can be automated or can require interaction of a participant (i.e., they can be a human task). As shown, the business process begins with a message from Role 1 at the flow object labeled Message Start sent to flow object Service Task associated with Role 2. Service Task is an automated process step that executes its function and sends information or instructions to flow object User Task. User Task is a process step assigned to a participant. As shown, the participant is a member of Role 2. Referring back to FIG. 1, the process player interface 150 allows defined project roles 152 to include project members 154 that can be added or removed by the process analyst at the process player interface 150.

In running the simulation of the business process in the process player, the user is prompted to set a condition at User Task. The condition can include, for example, selecting a member from the list of members associated with Role 2 and providing information and/or instructions. For example, the condition can require the selected member to enter information requested in the message from the starting process step. Once the condition is set, User Task executes its function and sends information and/or instructions to flow object Message. Message sends a message to flow object Exclusive Gateway which, based on the content of the message, either progresses to flow object End where a message is sent back to Role 1 or sends information or instructions to flow object User Task 1, which requires interaction from a participant and which therefore prompts the user to set a condition at User Task 1. The business process then progresses to End once the condition is set from the participant of User Task 1 and a message is sent back to Role 1.

In accordance with an embodiment, the process player can simulate real-world behavior of a business process, and enable a user to test and revise their processes without having to save and deploy the underlying project. The path a particular process instance takes through the business process depends on the input data provided for various process steps. Further, in an embodiment, the process player can render the path taken in the business process on a process canvas of the interactive workspace as the business process progresses from process step to process step. As shown in FIG. 2, highlighting around the graphical depictions of flow arrows running from Message Start to Service Task to User Task to Message to Exclusive Gateway to User Task 1 to End are all rendered to visually reflect what is happening as the business process progresses through the individual process steps. Likewise, highlighting around the flow objects for the process steps is rendered when the business process arrives at the process step. The changes in the graphical depictions reflect what is happening in the process, i.e., highlighting visually indicates the path that the simulation progressively takes through the business process, which can be one of many different possible paths. The simulation of the business process generates an instance, which includes the path the simulation takes and all instructions and information gathered and generated during the simulation. Multiple instances can be generated, and accessed at will. In an embodiment, an instance can be accessed and played by the process analyst and/or any other user accessing the design environment, recreating the simulation that generated the instance shown in FIG. 2.

Figure 3:
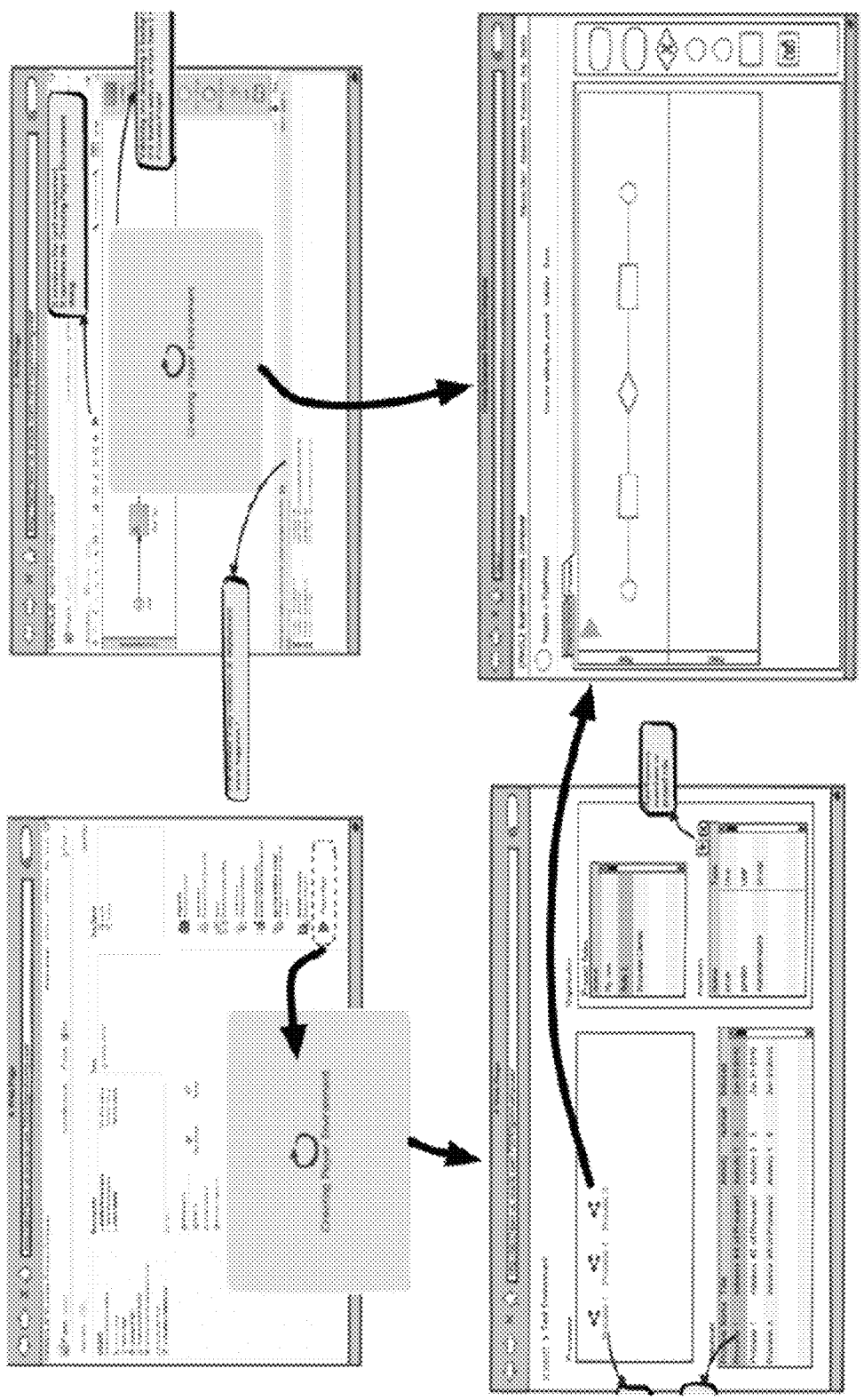
FIG. 3 illustrates an exemplary series of interfaces accessible within a business process design environment with a deployed process player, in accordance with an embodiment.

FIG. 3 is an overview illustrating multiple different interactive workspaces of a design environment with which a process player is usable, in accordance with an embodiment. The process player can be initiated from various parts of the design environment. For example, in a Composer environment, the process player can be initiated from a project home page, or a process canvas. In accordance with other embodiments, the process player can be initiated using different mechanisms. FIGS. 4-7 illustrate the components shown in the overview of FIG. 3.

Figure 4:
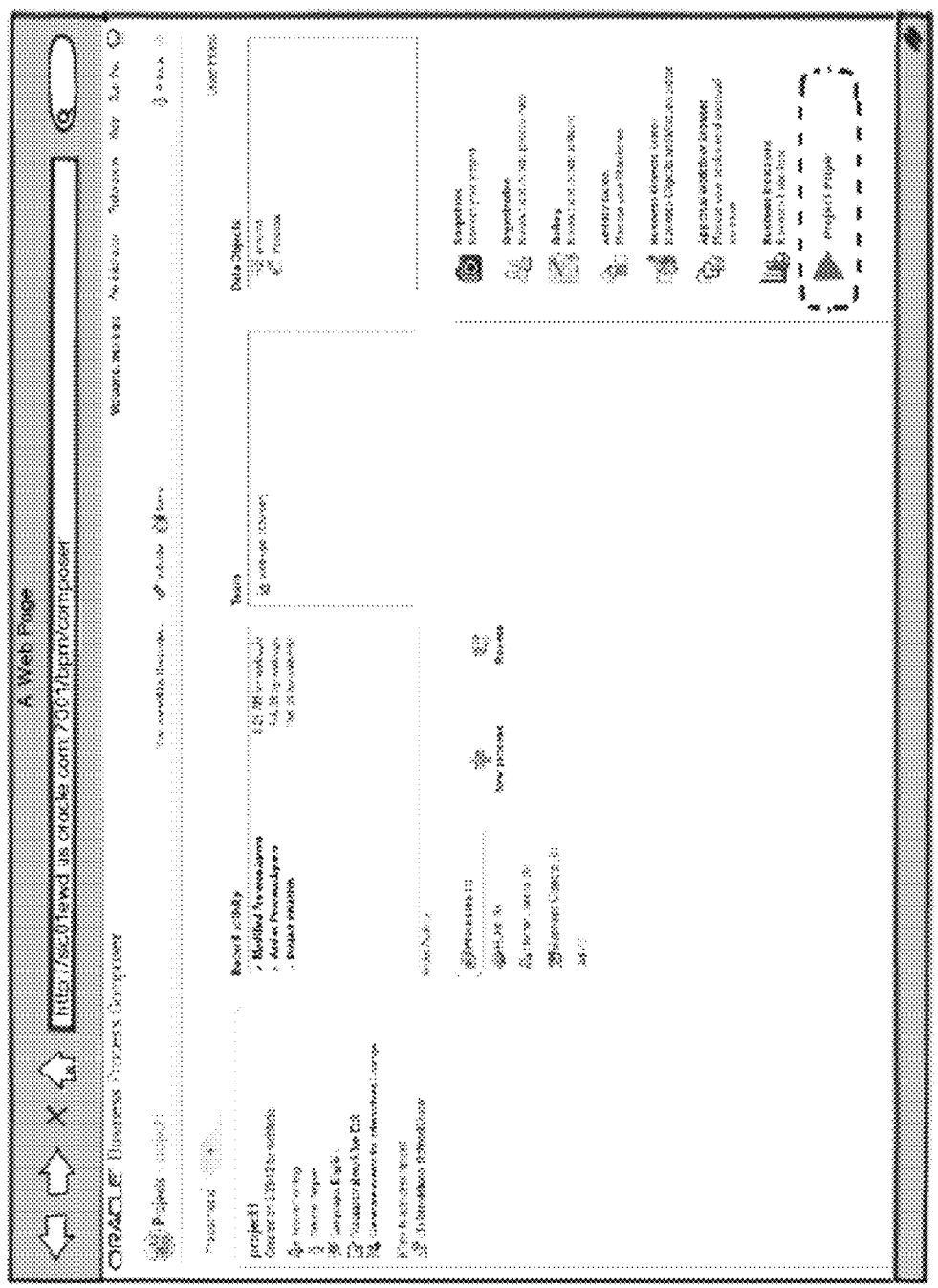
FIG. 4 illustrates an interface from the business design environment of FIG. 3 that can provide high level access to business processes.

FIG. 4 illustrates the project home page of the design environment for the embodiment of FIG. 3. The project home page shows an overview of a project including a list of processes, rules, process steps including human tasks and automated tasks, and business objects. The project home page also shows recent activity, team members, and other information related to a project. The process player can be initiated by the user from the project home page by selecting a project process player icon. As shown, the process player icon is located at the bottom right of the project home page. The process player is then initiated, and an interface is provided to the user for use in subsequently playing the business process. In an embodiment, the interface can be a test environment as shown in FIG. 6.

Figure 5:
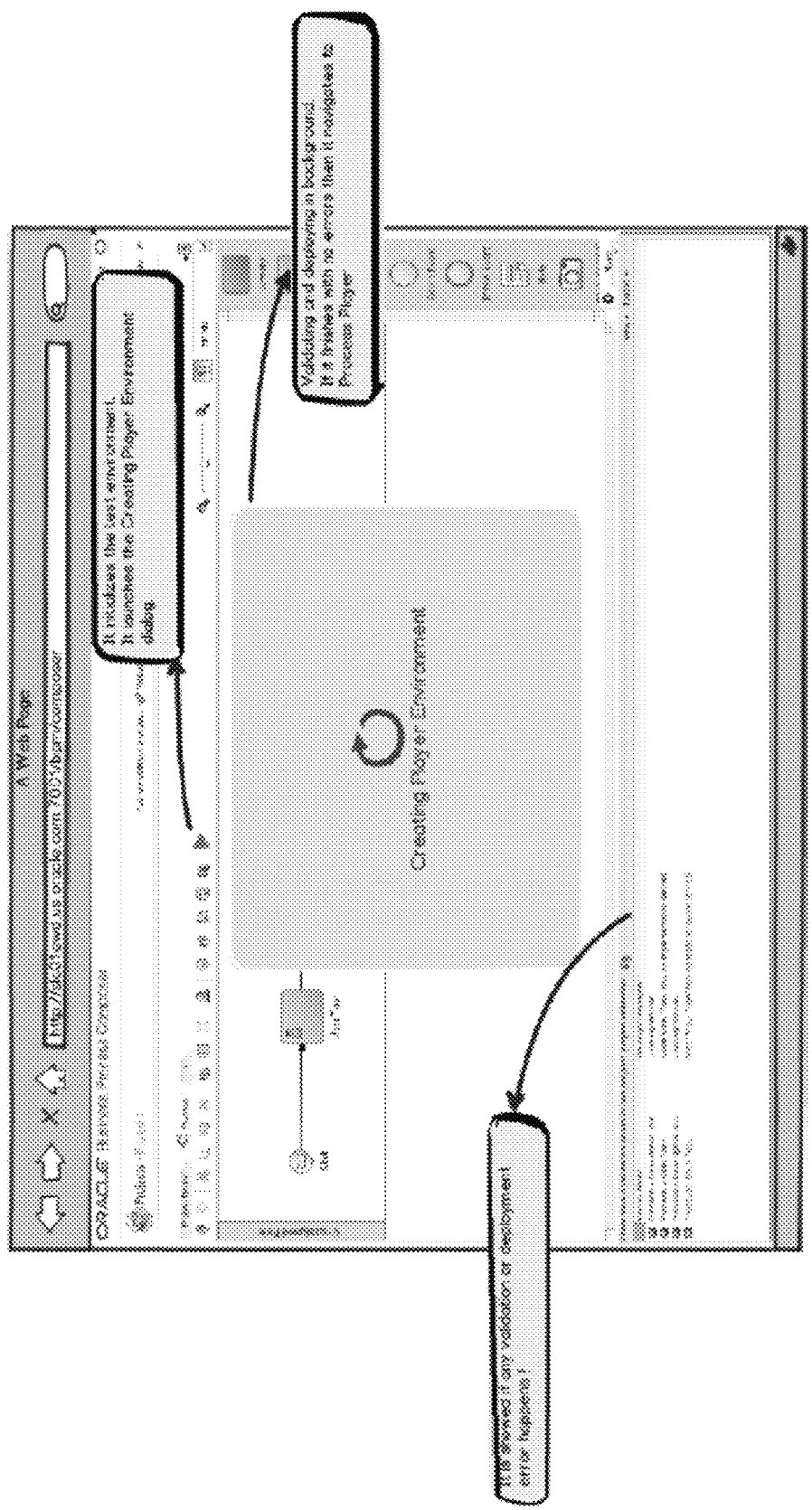
FIG. 5 illustrates an interface from the business design environment of FIG. 3 allowing a business process to be created and edited, and/or allowing a business process to be simulated using the process player.

FIG. 5 illustrates the process canvas of the design environment for the embodiment of FIG. 3. The process player can be initiated by the user from the process canvas page. The process canvas is an interactive workspace in which flow objects can be populated to generate a flow representing a business process. An example of such a flow is shown in FIG. 2 and discussed above. As shown, the project player is initialized by a play icon at the end of a toolbar located above the flow. When initiated in this manner, the system can validate and deploy the business process while initializing the process player, providing notification of any validation or deployment errors in a panel at the bottom of the process canvas. As above, the process player is then initiated, and an interface provided to the user for use in subsequently playing the business process.

Figure 6:
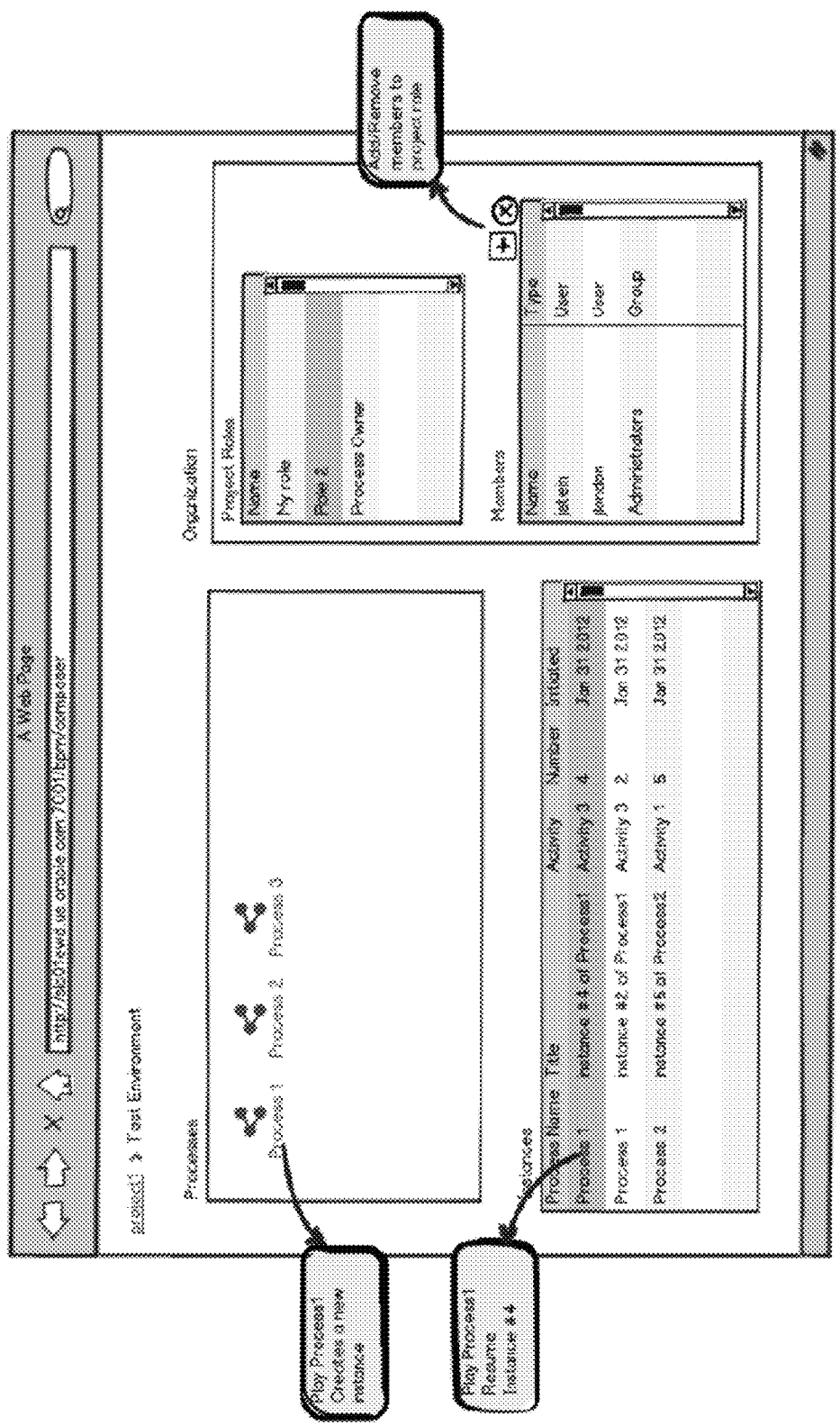
FIG. 6 illustrates a test environment interface from the business design environment of FIG. 3 allowing one or more business processes to be simulated via the process player and allowing a user to view instances generated by simulation of the one or more business processes.

FIG. 6 illustrates a test environment for the embodiment of FIG. 3. The test environment is an interactive workspace that provides an overview of available processes for a project in the upper left panel, allows a user to create and configure a new process instance by clicking on processes in the upper left panel, play a previously created and configured process instance from the lower left panel, and add or remove members in the lower right panel to or from a project role highlighted in the upper right panel. Multiple process instances for the same or multiple processes can be found in the instances of the lower left panel. An instance generated by the process player when simulating the business process can be automatically saved and accessible from the test environment. In an embodiment, when a business process is edited or otherwise changed, the instances of the previous revision of the business process can be purged from the test environment. In an alternative embodiment, the instances of the previous revision can be saved and relabeled, for example, or persisted to another list. The list of project role in the upper right panel is typically not editable from the test environment, but is created with the creation of process steps, such as human tasks.

Figure 7:
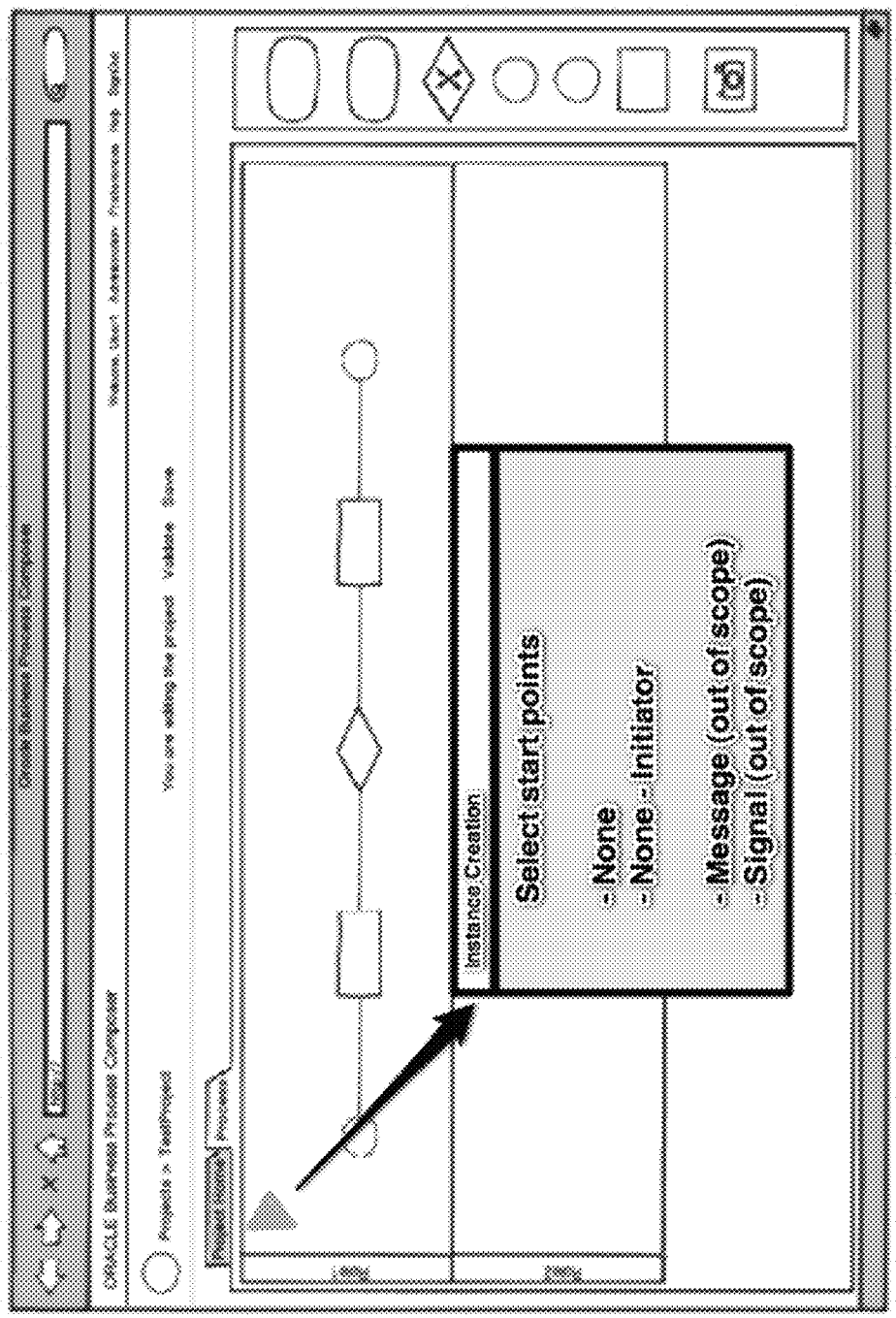
FIGS. 7 and 8 illustrate the use of a process player within the interface of FIG. 5, in accordance with an embodiment.

FIG. 7 further illustrates the use of a process player, in accordance with an embodiment. As shown in FIG. 7, within the process player, the user can modify configuration information that will be associated with that process instance, for example process start points, to create a process instance that can then be played.

Figure 8:
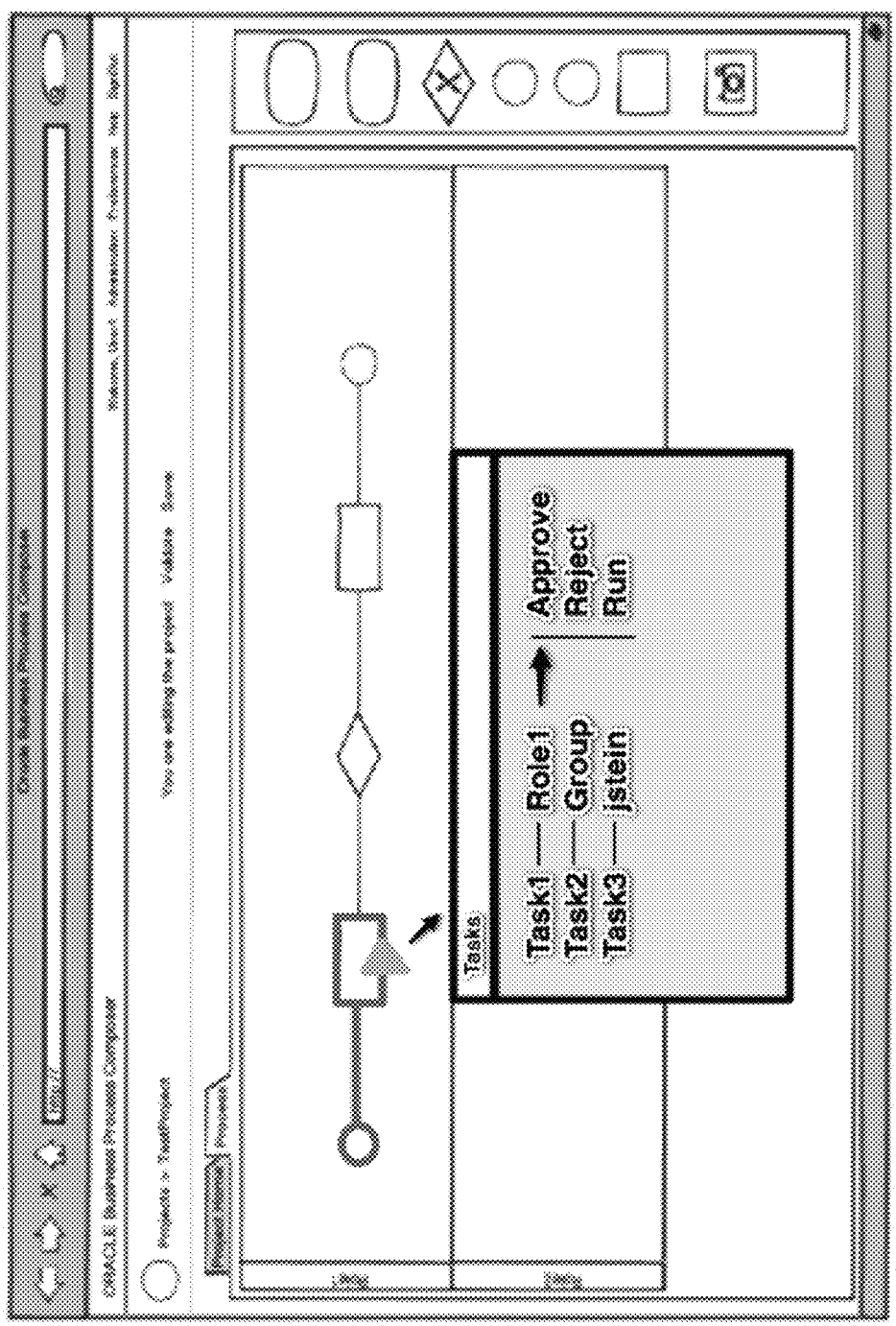

FIG. 8 further illustrates the use of a process player, in accordance with an embodiment. As shown in FIG. 8, during play of a particular process instance, tasks can be presented to the user, and the user can then determine how to appropriately respond to those tasks, for example by approving or rejecting a particular task as if they were the participant or participants, i.e., the role responsible for that particular task or set of tasks.

Figure 9:
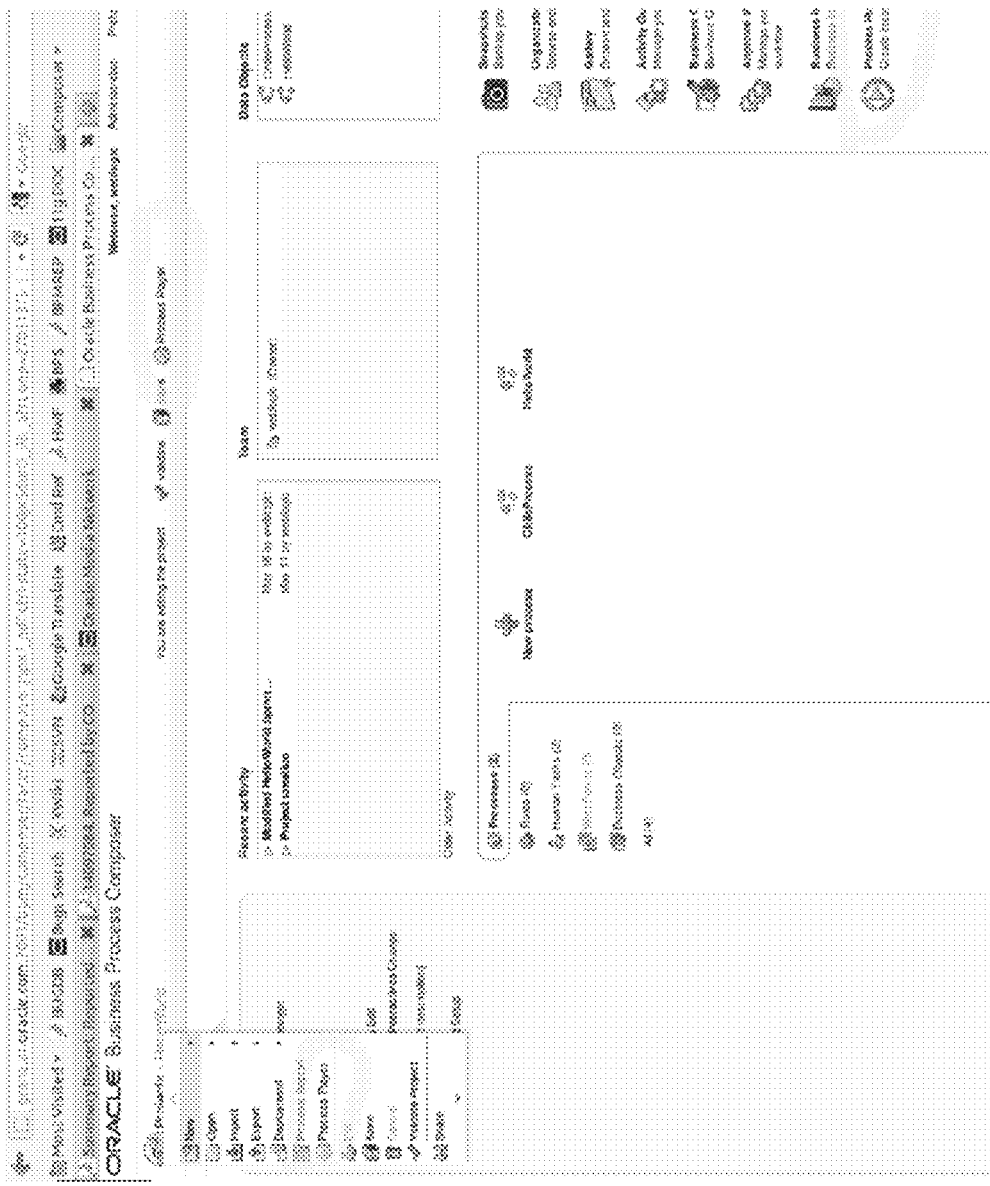
FIG. 9 illustrates an interface from a business design environment that can provide high level access to business processes, in accordance with an alternative embodiment.

FIG. 9 illustrates a further example of a project home page of a design environment including a process player, in accordance with an embodiment. In the example, the design environment can be an environment as provided by ORACLE® Business Process Composer or another design environment. In accordance with an embodiment, a user can access the process player from their project home page by selecting one of the icons included on the toolbar, menu, or quick links list. The user can also access the process player by clicking a process player toolbar icon while they are editing their process canvas, in which case the system will initiate the process player with the current process already opened and ready to start a process player instance.

Figure 10:
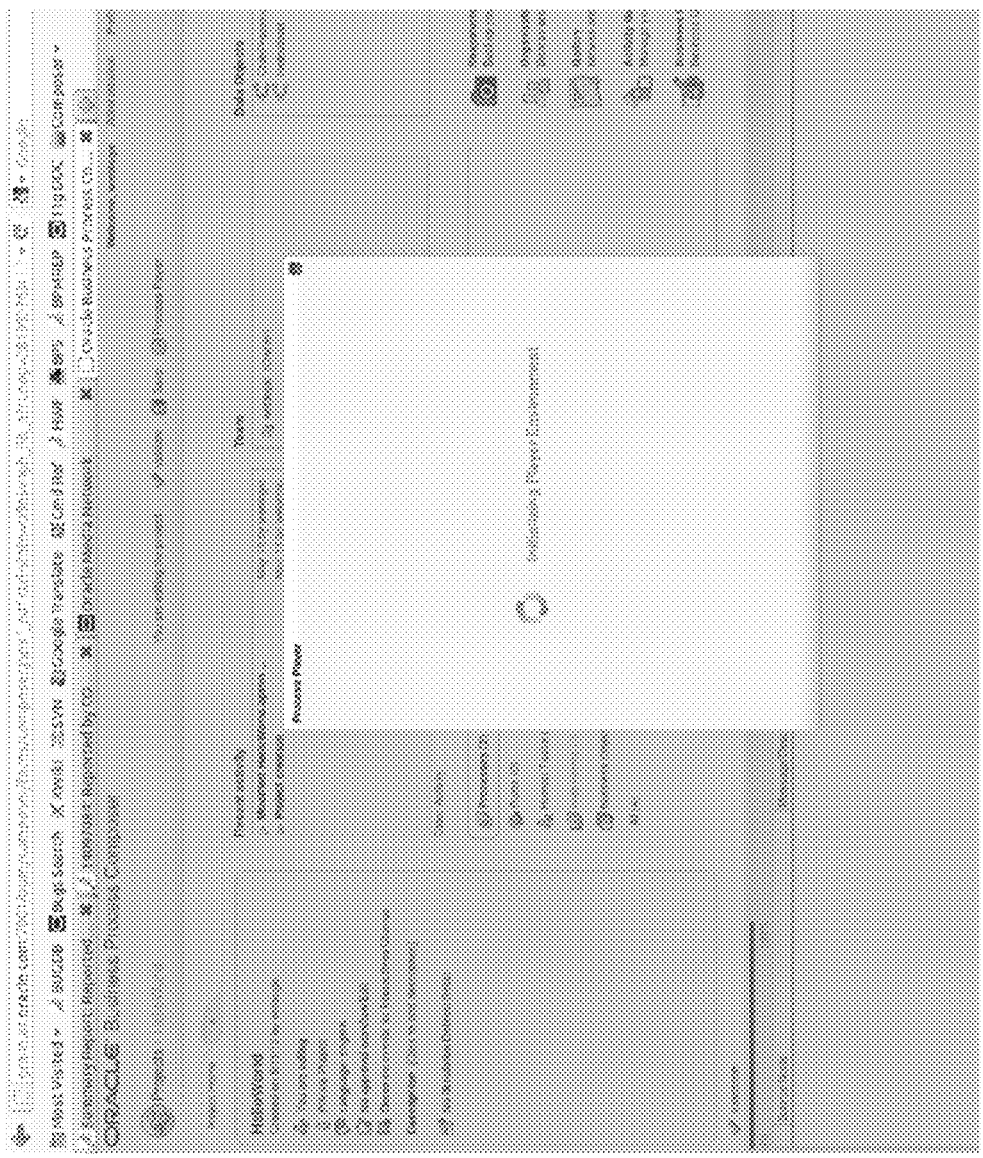
FIG. 10 illustrates the interface of FIG. 9 wherein a process player is initialized within the business process design environment, in accordance with the alternative embodiment.

In accordance with an embodiment, the process player displays a legend 'Initializing Process Player Environment' while the project is being validated and deployed. FIG. 10 illustrates the example project home page of FIG. 9 with the process player being initialized upon clicking on the process player icon, in accordance with an embodiment. As shown in FIG. 10, if a project does not validate correctly, then the system can display an appropriate error message, for example in the bottom panel behind the highlighted initialization window. The process player can also maintain a record of changes made to a business process, to avoid redundant deployments when no changes have been performed.

Figure 11:
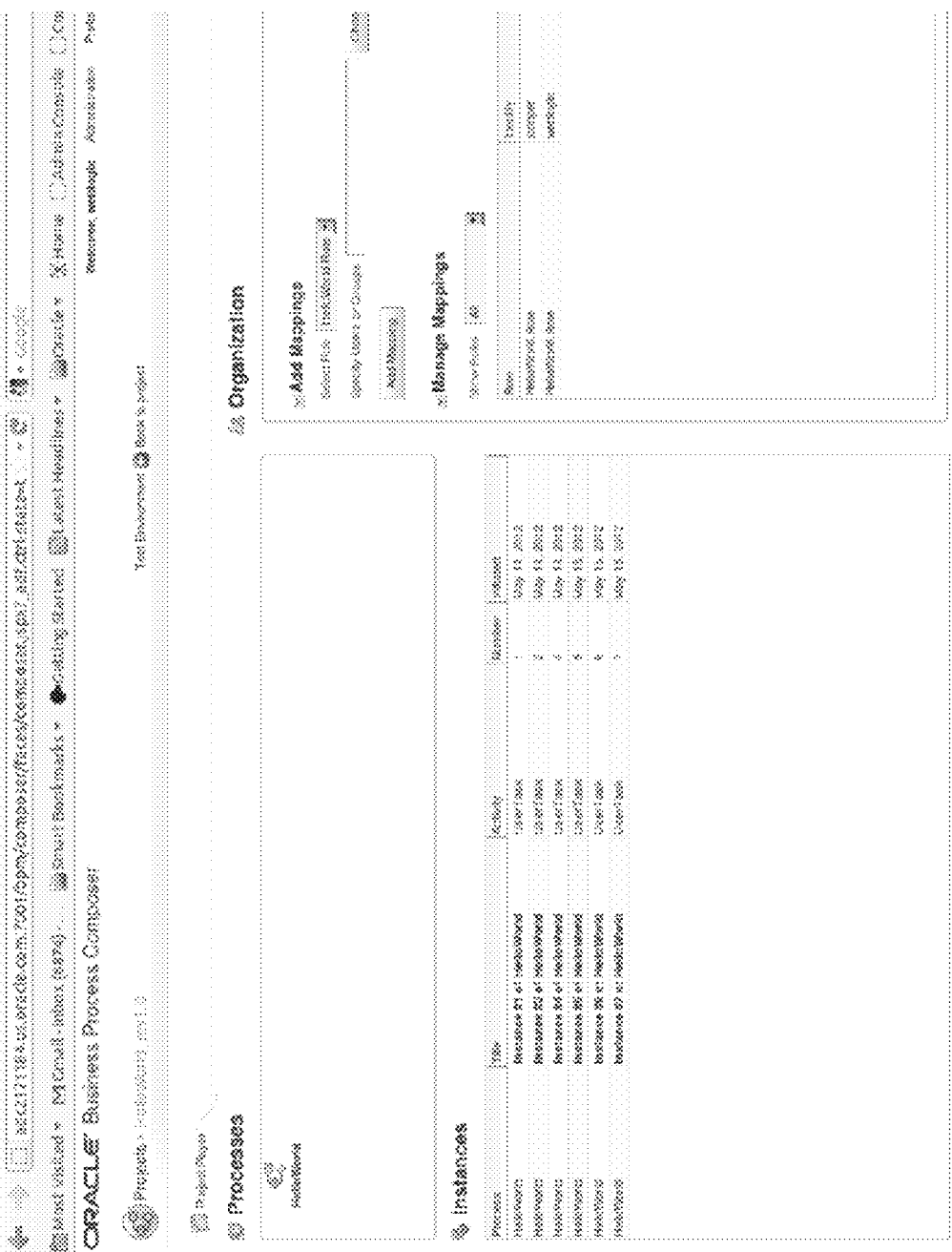
FIG. 11 illustrates a test environment interface from a business design environment allowing one or more business processes to be accessed and allowing a user to view instances generated by simulation of the one or more business processes, in accordance with the alternative embodiment.

FIG. 11 illustrates a further example of a test environment for the design environment, in accordance with an embodiment. The test environment of FIG. 11 resembles the test of the embodiment of FIG. 6 with changes to the layout. As can be seen, the test environment includes a single process (HelloWorld) in the upper left panel and instances for the process generated by simulations performed using the process player are listed in the lower left panel. The right panel is an organization panel that includes a drop down list for selecting a role and a list of members of the role in the lower right panel. As shown in FIG. 11, the user can open a business process to create a new instance, resume an already created instance, and/or perform role mapping. The instances panel provides a description table with each of the instances currently running in the process player, including information such as the process where the instance is running, the node name where the instance stays, and the instance creation time. The organization panel allows the user to add users or groups to a project role and to see the role assignments. To add users or groups, the user can select a project role, and then either type the names of users or roles, or select them using a choose button, and then clicking an add-mapping button to complete the assignment.

Figure 12:
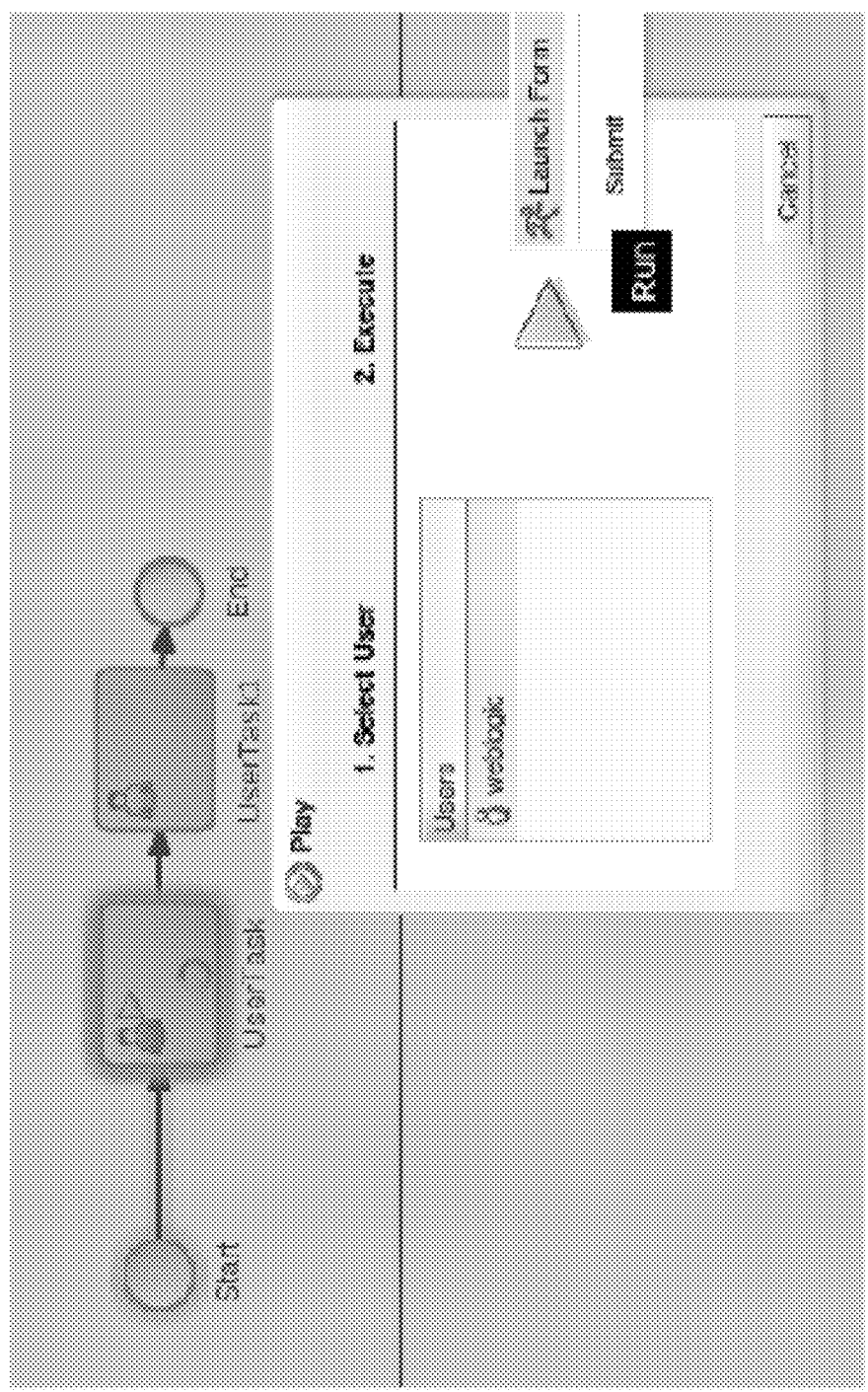
FIG. 12 illustrates an exemplary prompt by a process player simulating a business process to a user to set a condition during a simulation at a point in the business process where a participant is designed to be engaged with the business process, in accordance with an embodiment.

FIG. 12 further illustrates an example of a process player stepping through a business process, in accordance with an embodiment. As shown in FIG. 12, to begin testing a project, the play button on the start event can be selected to create an instance. A dialog box opens up at the prompting of the process player to select a participant for a user task, allowing the user to choose between possible executors for the associated task. Once an executor is selected, the user can select the play button to launch a form for collecting data and trigger the instance creation.

In accordance with an embodiment, if an activity is an automatic one, the user can use the refresh button on the toolbar to request the application obtain the newer state of the instance and complete the path until it reaches a breakpoint (for example, a user task, call activity, end event, timer activity). When the instance reaches a breakpoint, the user can select the icon on that activity to act upon it. When the play button is selected for a user task, a dialog is displayed to allow the user choose between possible executors for the task.

In accordance with an embodiment, the possible outcomes can be those that are associated to the human task and defined by the process analyst (for example, submit, approve, or reject). By selecting any of these menu choices, the update task action on the current task will make the runtime proceed with the corresponding execution path for the task and the instance. The process player can then refresh the new instance state, and render on the process canvas the trail taken by the instance and its current position.

In accordance with an embodiment, when an instance reaches a process timer activity, the process player will move the instance to the next activity when it receives the click event from the user on the corresponding play icon. In accordance with an embodiment, when an instance reaches a call activity, a drilldown icon can be displayed which the user can select to drilldown to the child process called and continue testing the instance on it; similarly, when an instance reaches an end event the process player can display a drillup icon which the user can select to drillup to the parent process.

In accordance with an embodiment, any other activity where the instance can stand waiting for some operation or an external event can be resolved by the user from outside the process player, for example by sending the expected message. The user can then use the refresh button to update the new instance state.

Figure 13:
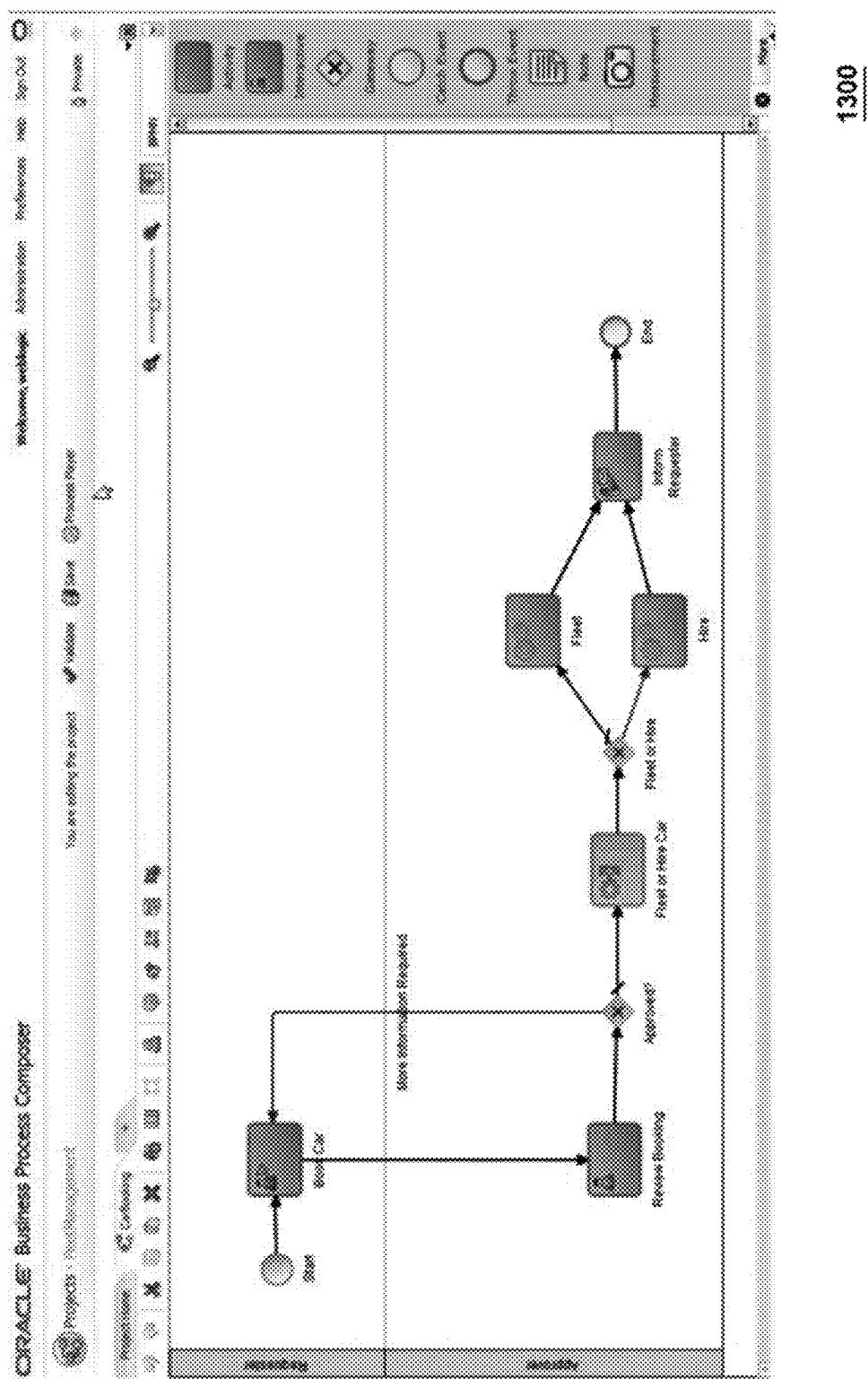
FIGS. 13-25 illustrate an exemplary business process created within an interactive workspace of a business design environment and simulated via a process player as the process player progressively steps through the exemplary business process, in accordance with an embodiment.

FIGS. 13-25 illustrate screenshots for a series of steps in a simulation of a business process performed by a process player within a process canvas, in accordance with an embodiment. The business process accepts a request for a car from an employee, approves or rejects the request, and upon approval assigns a car to the employee either from a company fleet or from a booking agency. The business process has two roles: requester and approver. The business process has three process steps that require interaction by a participant and a series of automated steps. Referring to FIG. 13, the process canvas 1300 is an interactive workspace with a menu of flow objects in a right panel that can be dragged and dropped into swim lanes 1302, 1304 representing the roles. As a flow object is dragged into a swim lane 1302, 1304, the process analyst designates a process step type (i.e., a sub-process) to be assigned to the flow object. Once a flow is created, the process player can be prompted to simulate (or "play") the business process, progressing through each process step in order.

Figure 14:
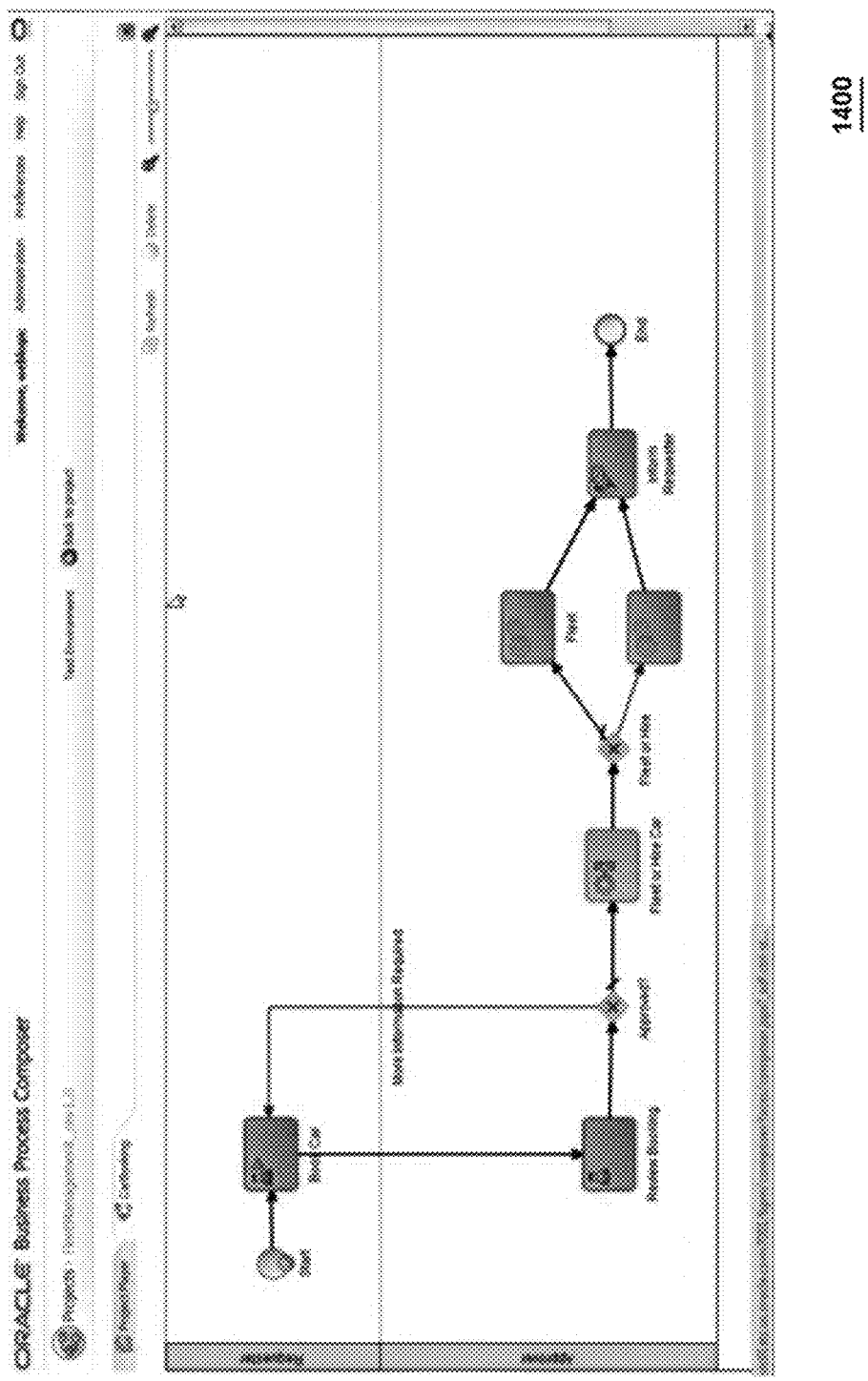

As can be seen in FIG. 13, the cursor is dragged to the Process Player icon along the toolbar. Once hovering over the Process Player icon, the icon is clicked with a mouse to active the process player. As will be appreciated, in other embodiments some other technique can be used to activate the process player. For example, where a touchscreen device is used, a user can simply touch the Process Player icon with a finger or stylus. FIG. 14 illustrates the transition from the process canvas 1300 which permits editing of the process flow and the process canvas 1400 when the process player is engaged. The right panel of flow objects disappears as do the icons for editing the process flow. The cursor is then hovered over the flow object Start and clicked to begin the simulation.

Figure 15:
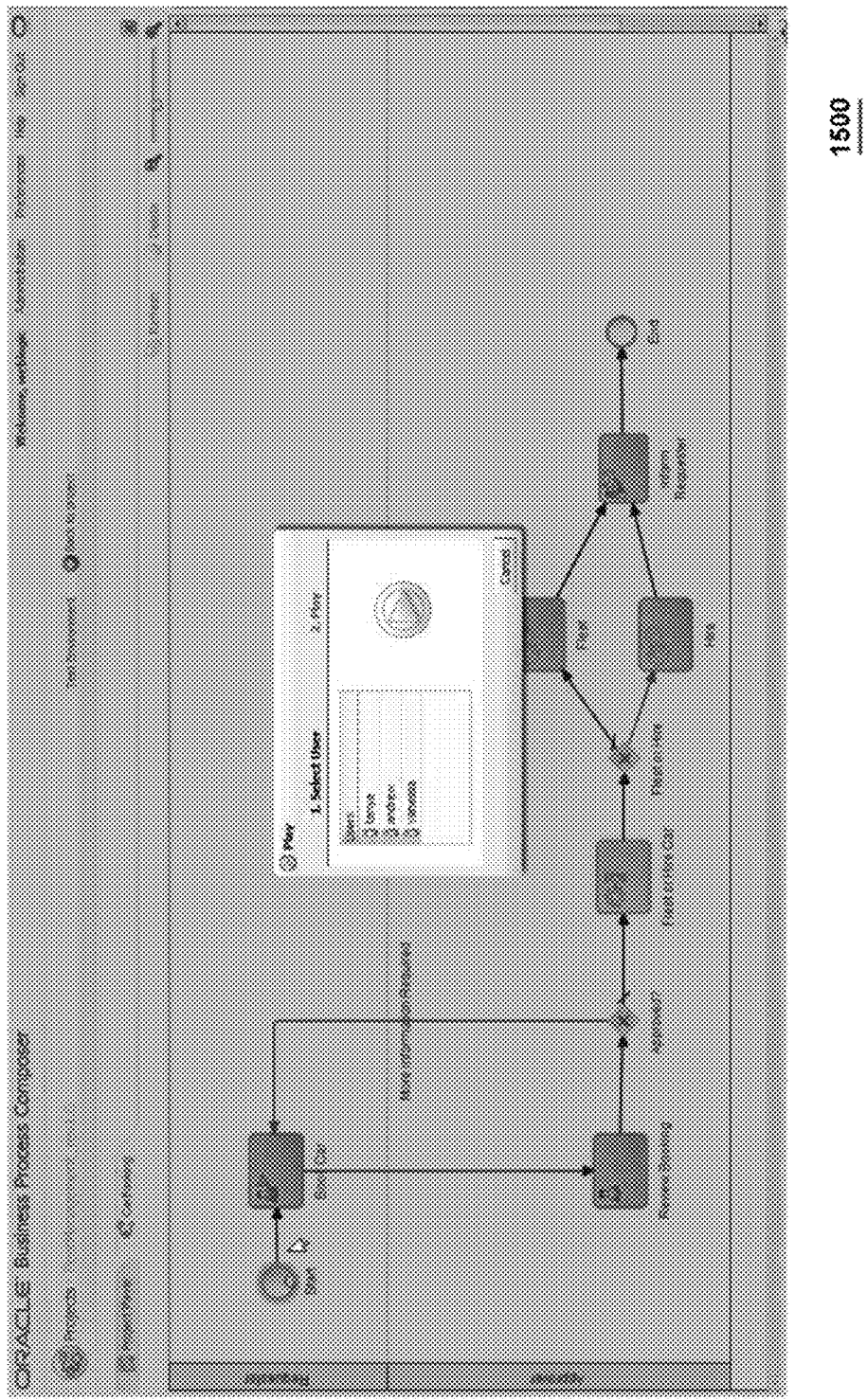
Figure 16:
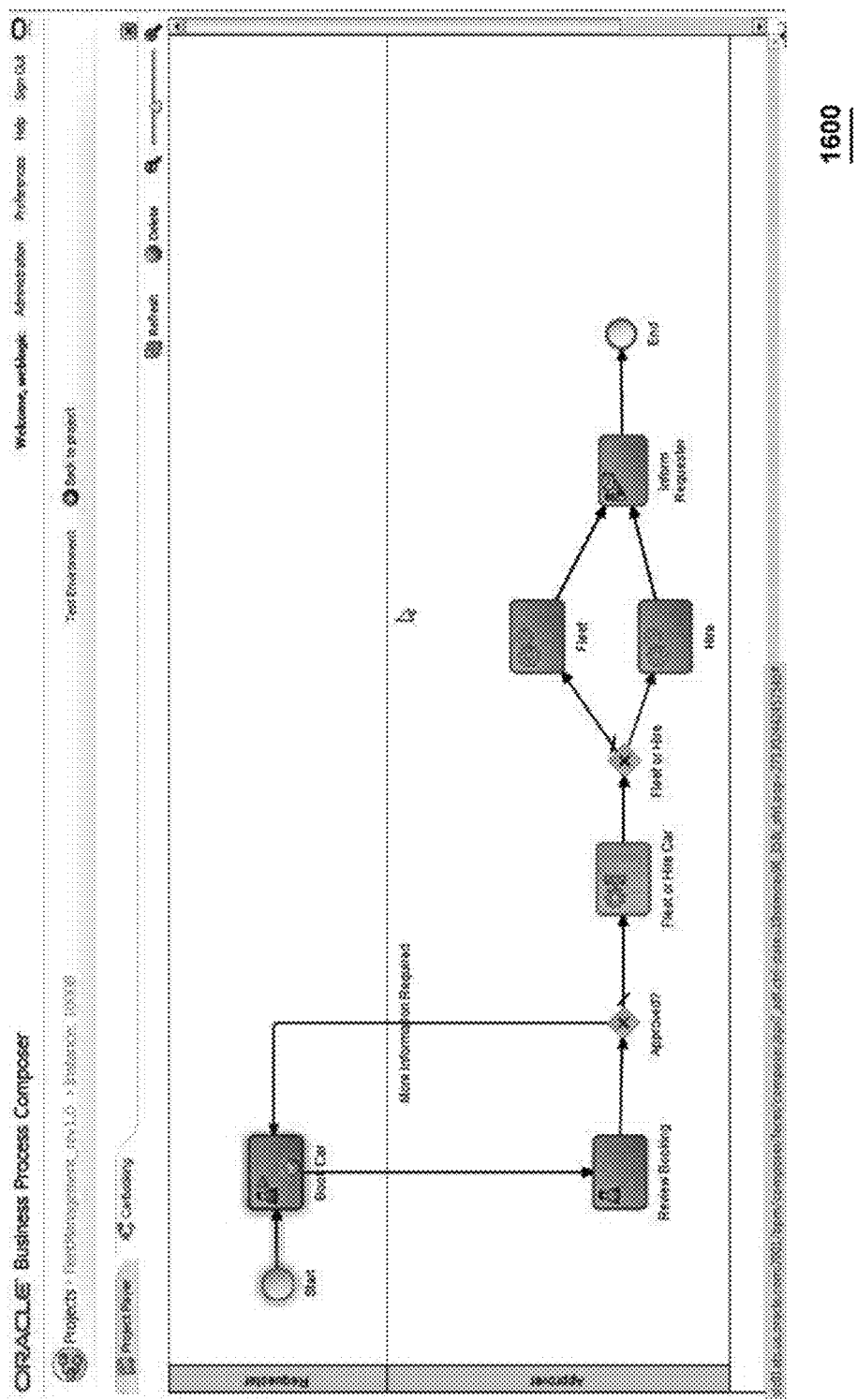
Figure 17:
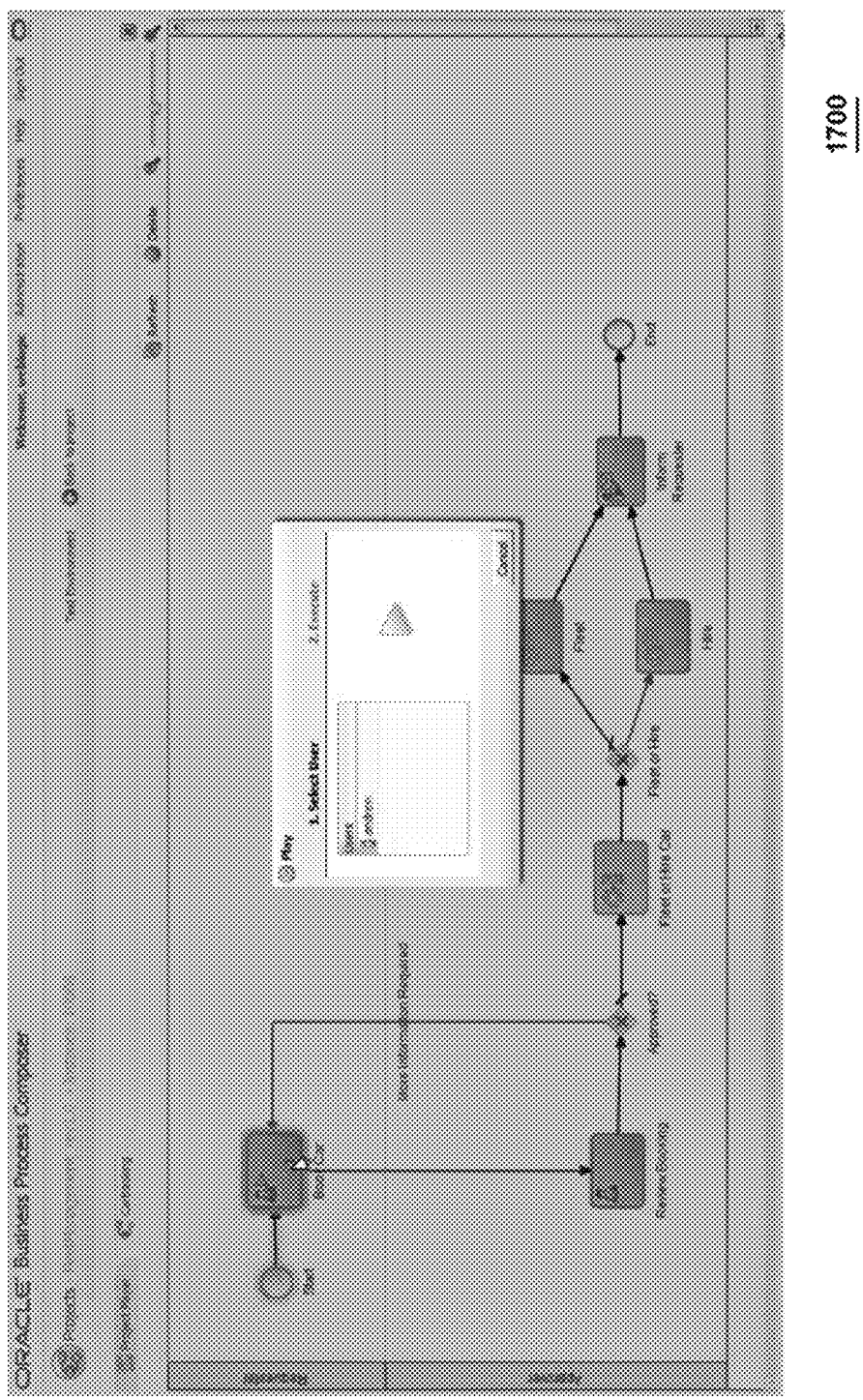
Figure 18:
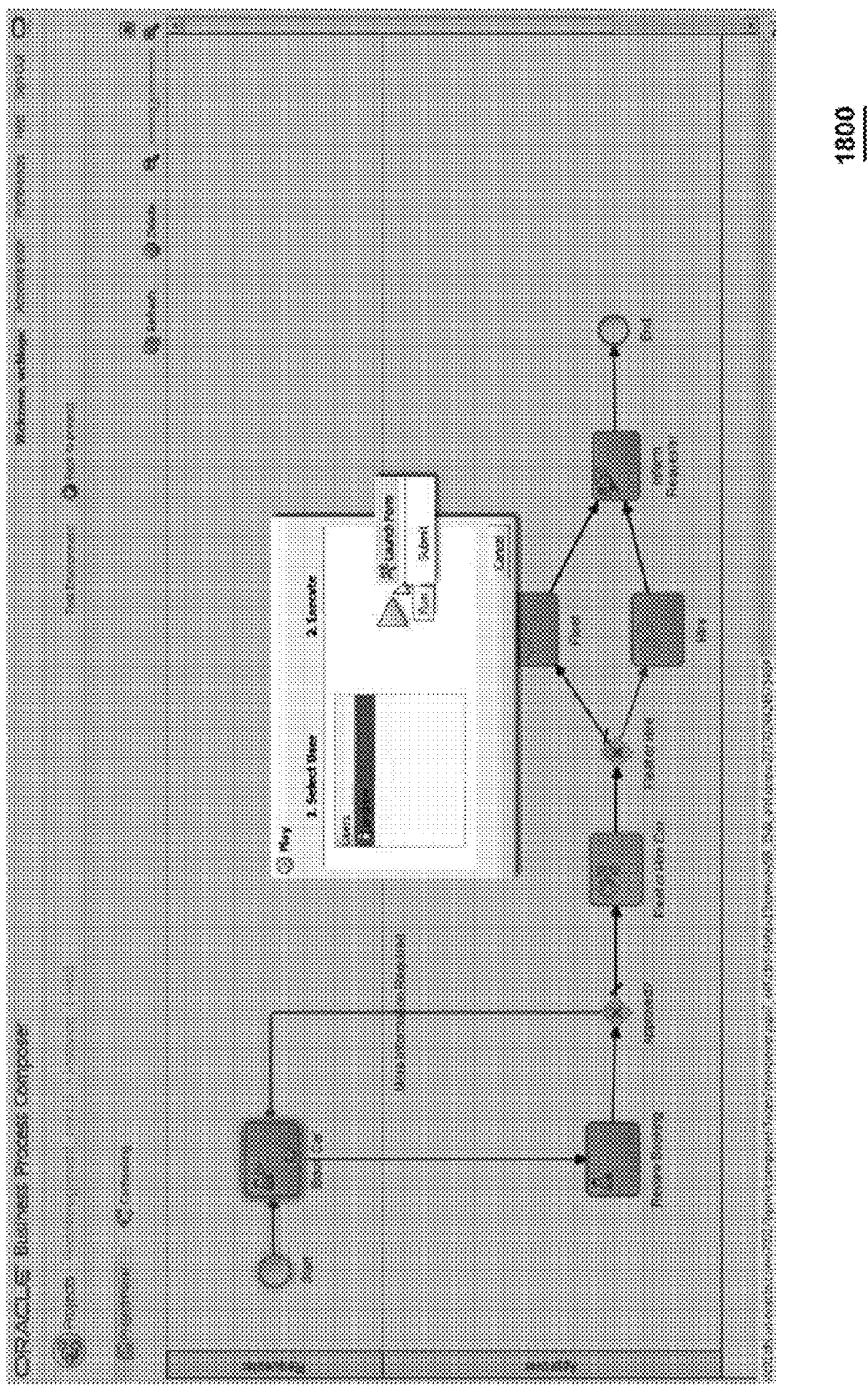
Figure 19:
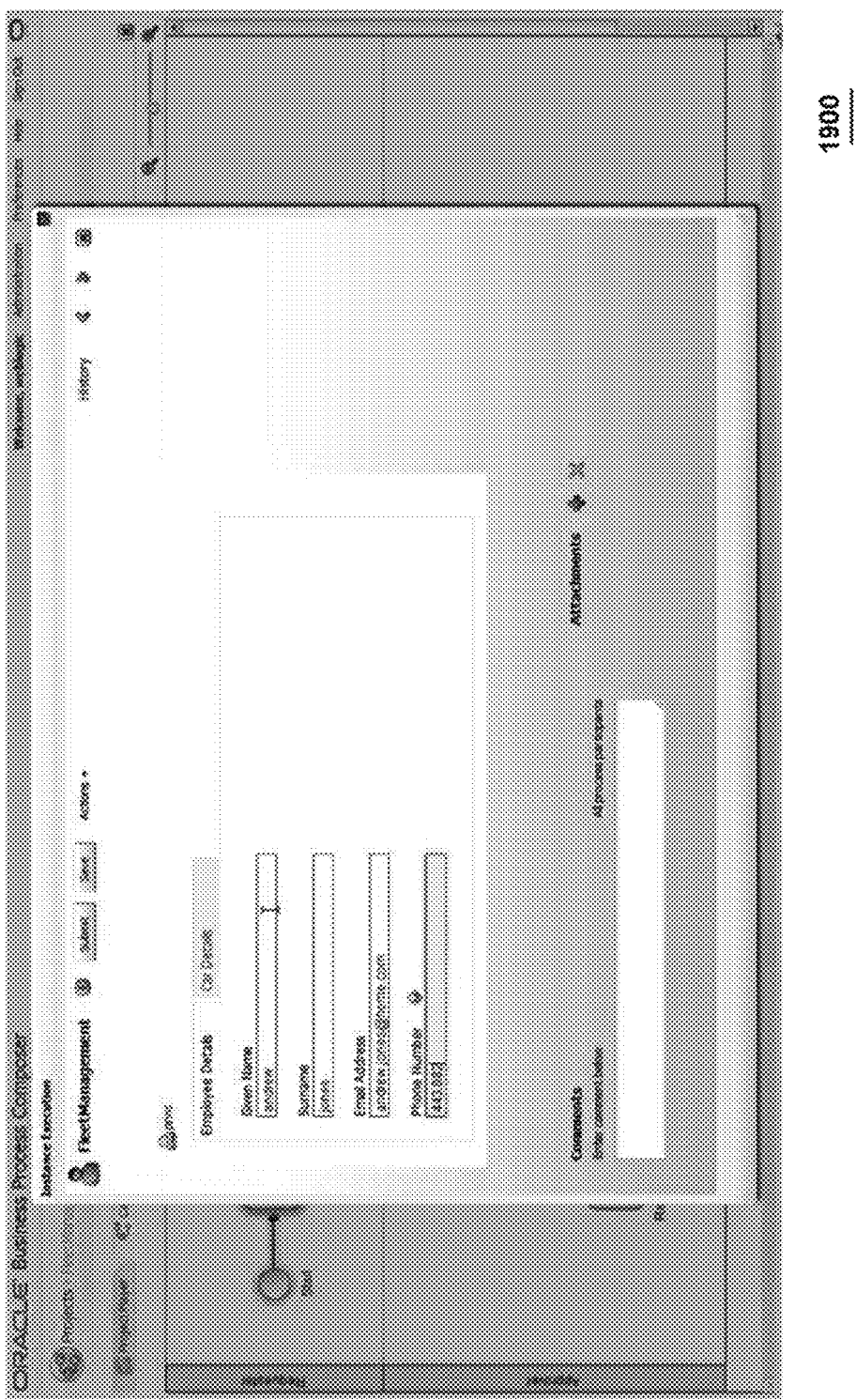
Figure 20:
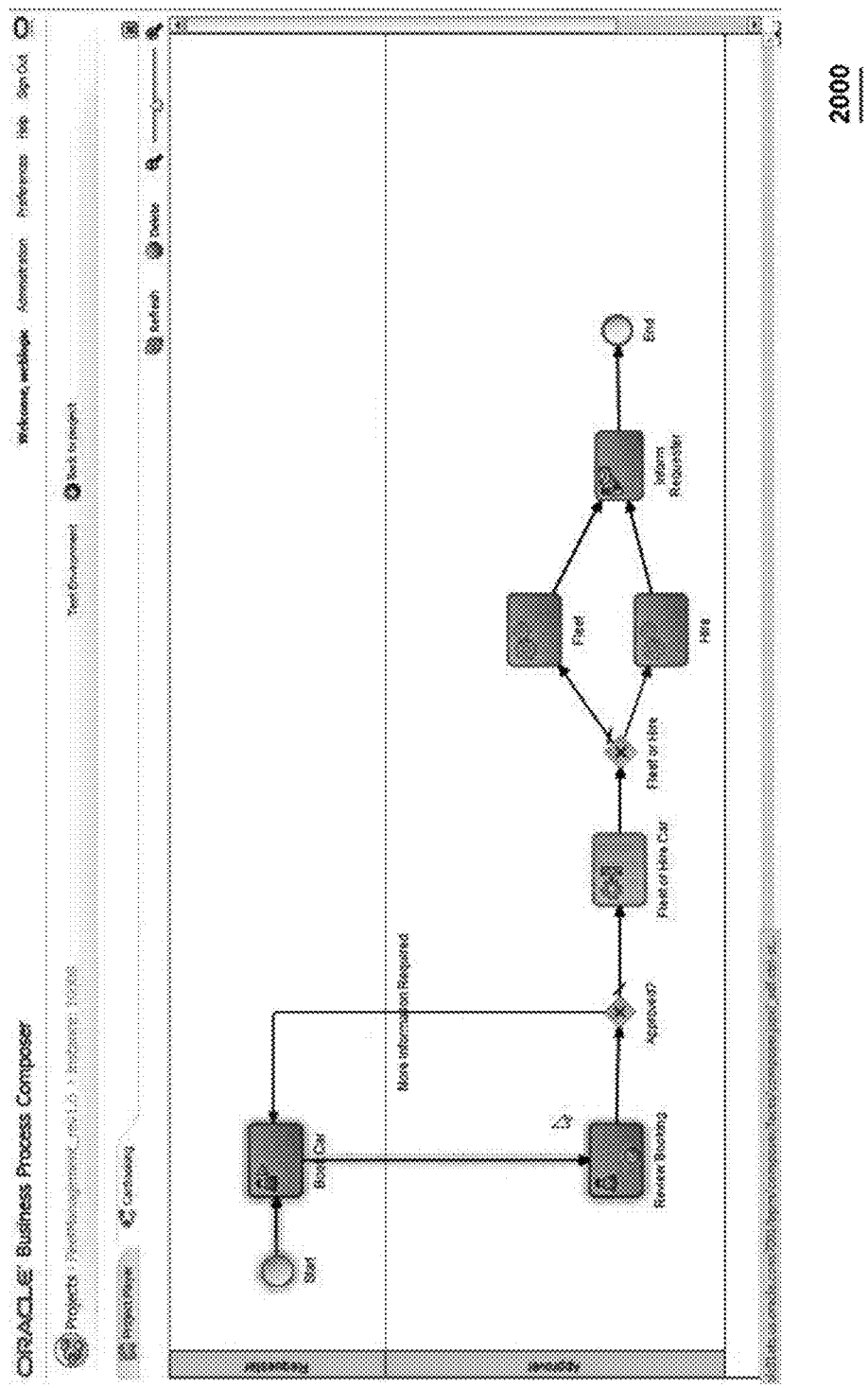

Referring to FIG. 15, highlighting around the flow object Start is rendered in the process canvas 1500 and a dialog box opens in response, prompting the selection of a user (i.e., a requestor) from a first list. The first list contains members of the Requester role, the members of which can be defined in the test environment as discussed above. User "andrew" is selected and the play button to the right of the list and under the Play step label is pressed. Referring to FIG. 16, in the process canvas 1600 highlighting around the flow arrow to and then around the flow object Book Car is rendered and the simulation pauses. A small play icon appears in the flow object Book Car. Referring to FIGS. 17 and 18, the cursor can be hovered over the flow object Book Car within the process canvas 1700, 1800 and clicked to open a dialog box. The user "andrew" is again selected and the cursor is hovered over and clicks the play icon under the Execute step label to open a pull down menu with options to Launch Form and Submit. Referring to FIGS. 19 and 20, upon choosing the option to Launch Form, a window pops up in the process canvas 1900, 2000 including the form for collecting employee details and car details in separate tabbed spaces. Once completed, the form can be submitted by clicking on the Submit icon at the top of the window.

Figure 21:
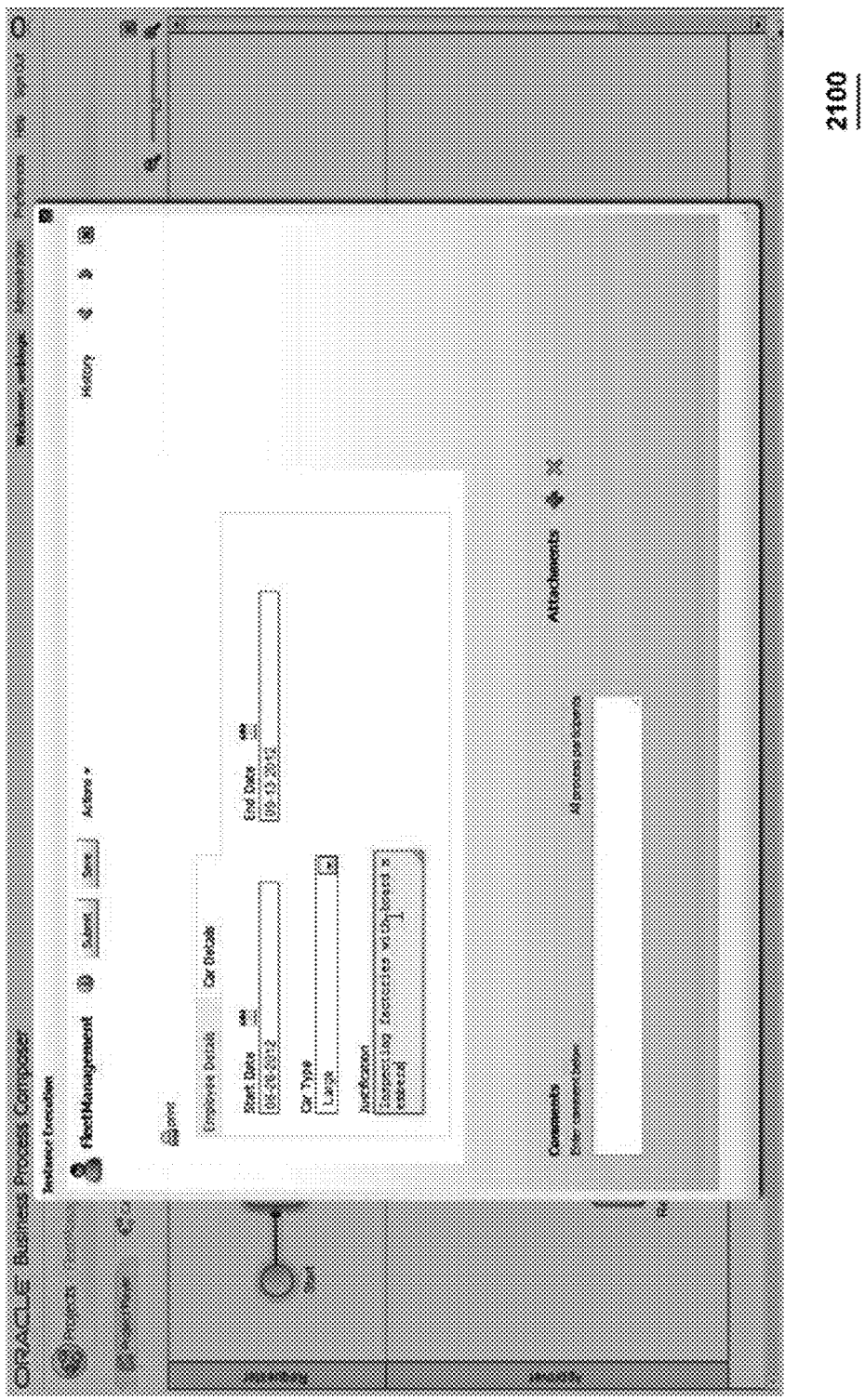
Figure 22:
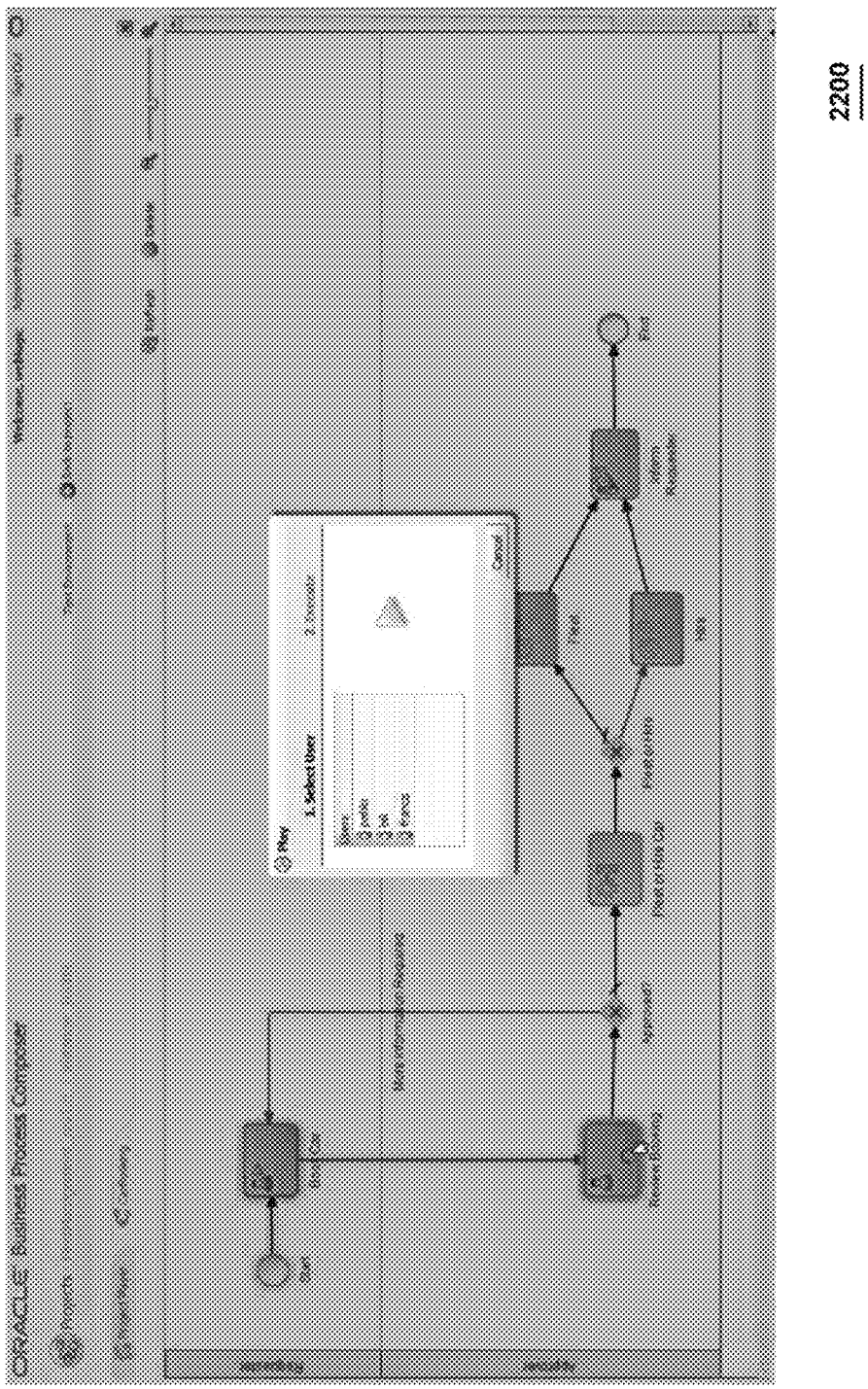
Figure 23:
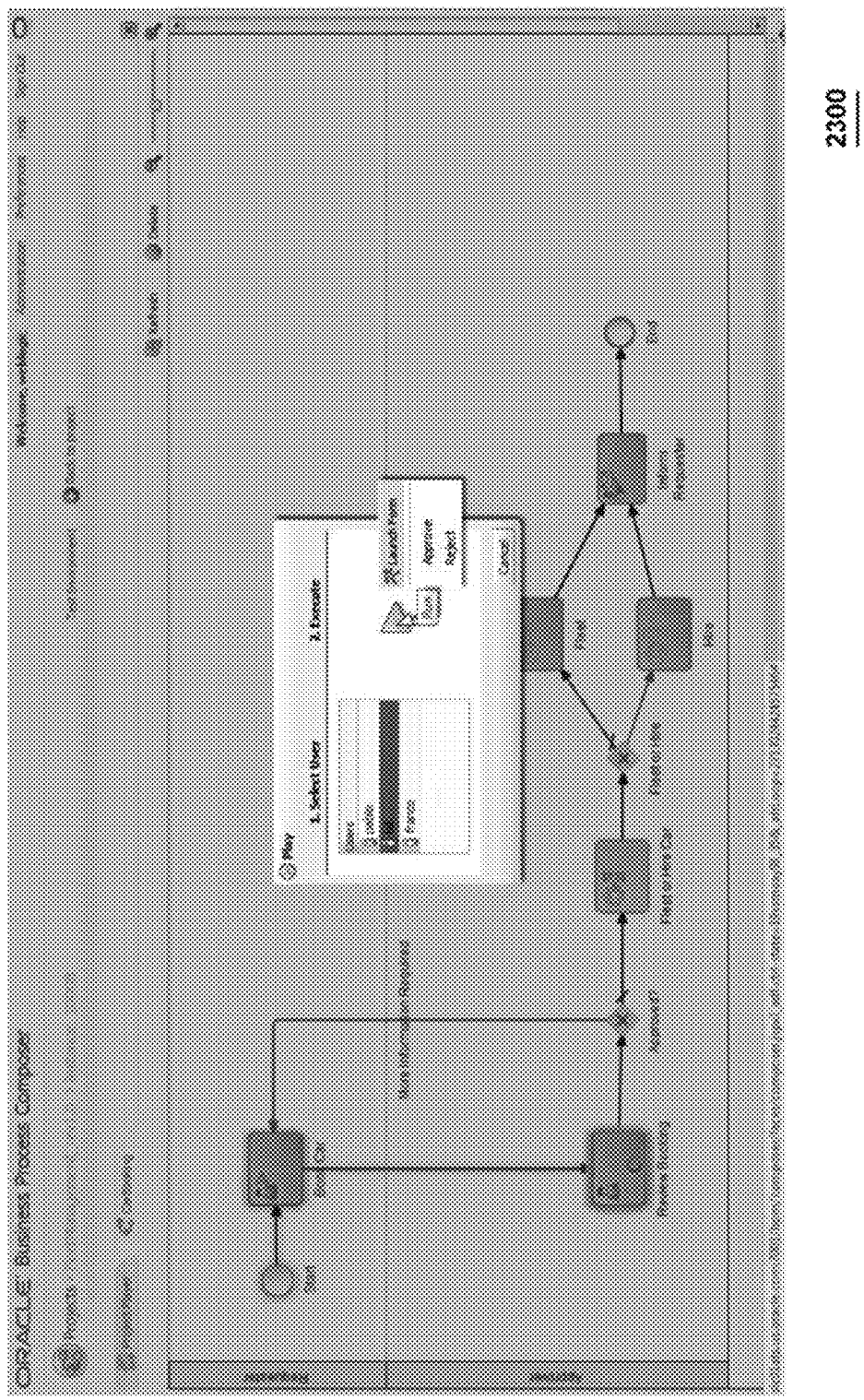
Figure 24:
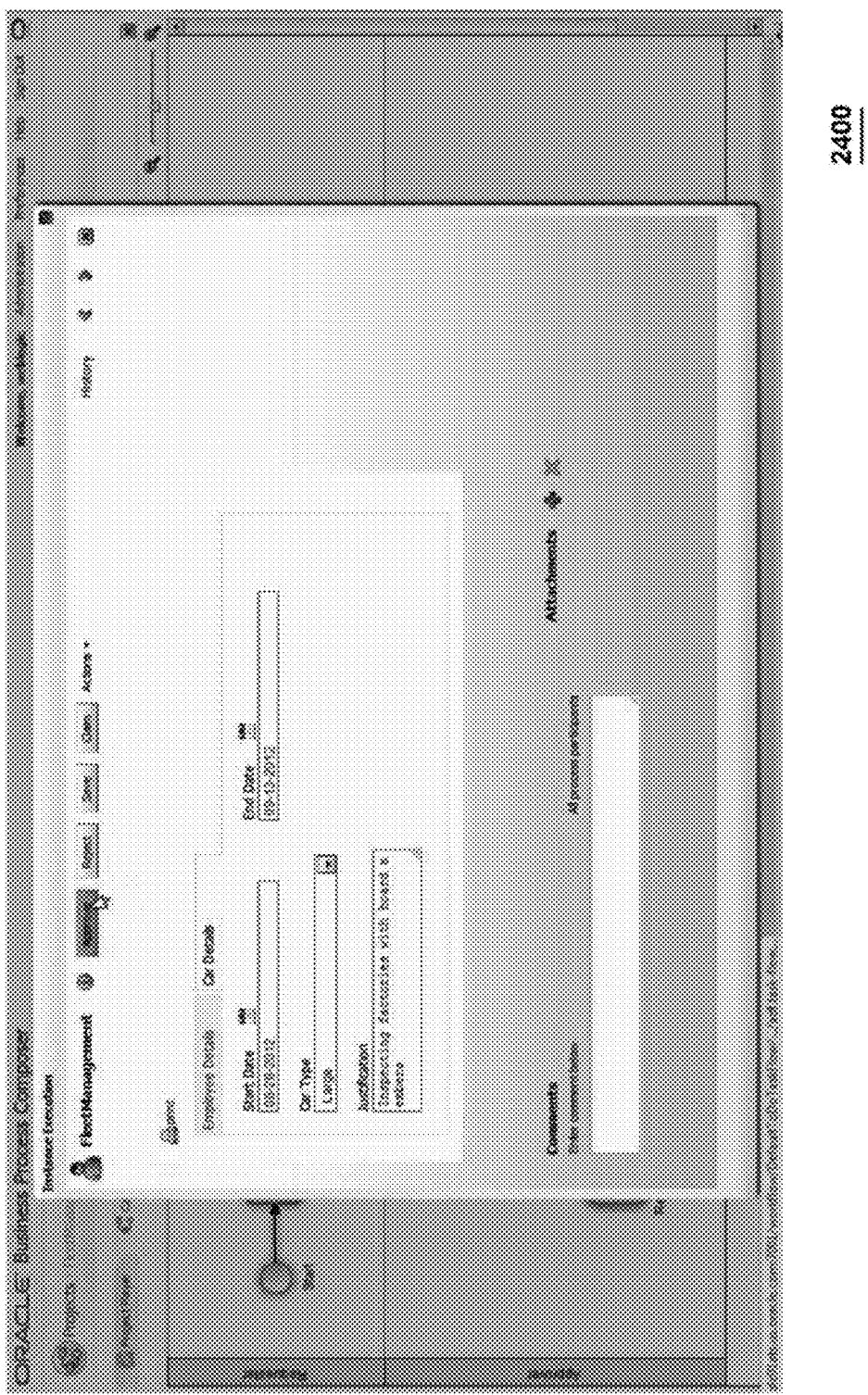

Referring to FIG. 21, once the condition for flow object Book Car is set, highlighting around the flow arrow to and then around the flow object Review Booking in the swim lane of the Approver role is rendered in the process canvas 2100 and the simulation pauses. A small play icon appears in the flow object Review Booking Referring to FIGS. 22 and 23, the cursor is then hovered over the flow object Review Booking within the process canvas 2200, 2300 and clicked to open a dialog box in response, prompting the selection of a user (i.e., an approver) from a second list. The second list contains members of the Approver role. Once the member of the Approver role is selected (user "bill" as shown) the cursor is hovered over and clicks the play icon under the Execute step label to open a pull down menu with options to Launch Form, Approve and Reject. Referring to FIG. 24, launching the form produces a window within the canvas 2400 containing the form filled out by the Requester for evaluation by the Approver. The request for a car can be approved or rejected from the window containing the form.

Figure 25:
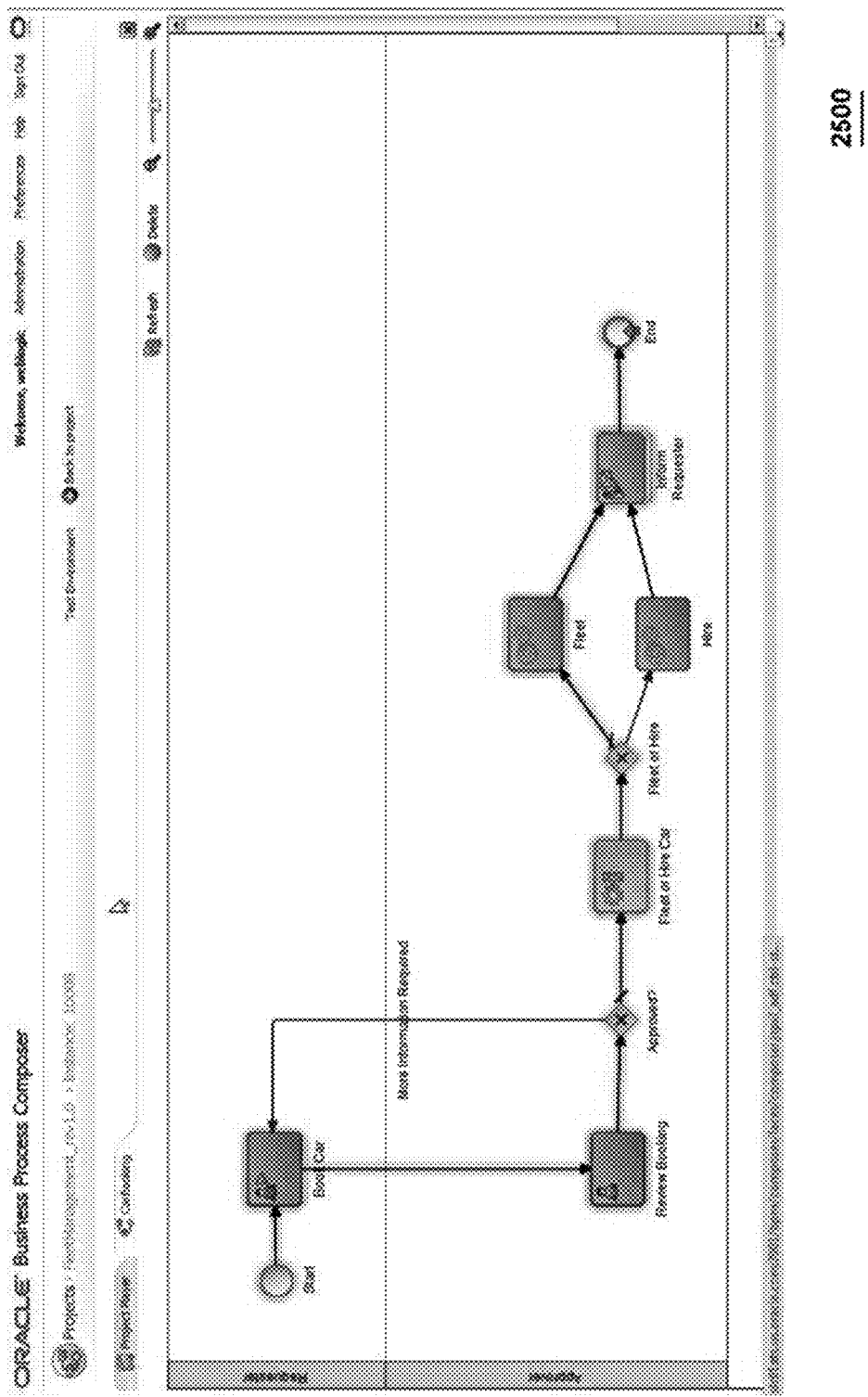

As can be seen in FIG. 25, the process steps that follow are all automated. Highlighting around the flow arrows to and then around the flow objects progresses through the path taken by the automated process steps, showing the execution of each process step in sequence in the process canvas 2500. As shown, the process player steps to the first gateway to determine whether the Approver has approved or rejected the request. Determining that the request is approved, the process player steps to the flow object Fleet or Hire Car to determine whether a car matching the details in the request is available from the company fleet, and if not whether the car should be hired. The process player then steps to the second gateway which splits the pathway based on the determination of whether to assign a car from the fleet or hire a car. As shown, the process player steps to the flow object Fleet, where it assigns a car and updates the fleet inventory. The process player then steps to the flow object Inform Requester, sending an email to the Requester that a request has been fulfilled. The process player then steps to the flow object End, completing the simulation. In an embodiment, an instance generated during the simulation can be reviewed and played thereafter until the business process is edited or deleted and/or the instance is deleted.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Figure 26:
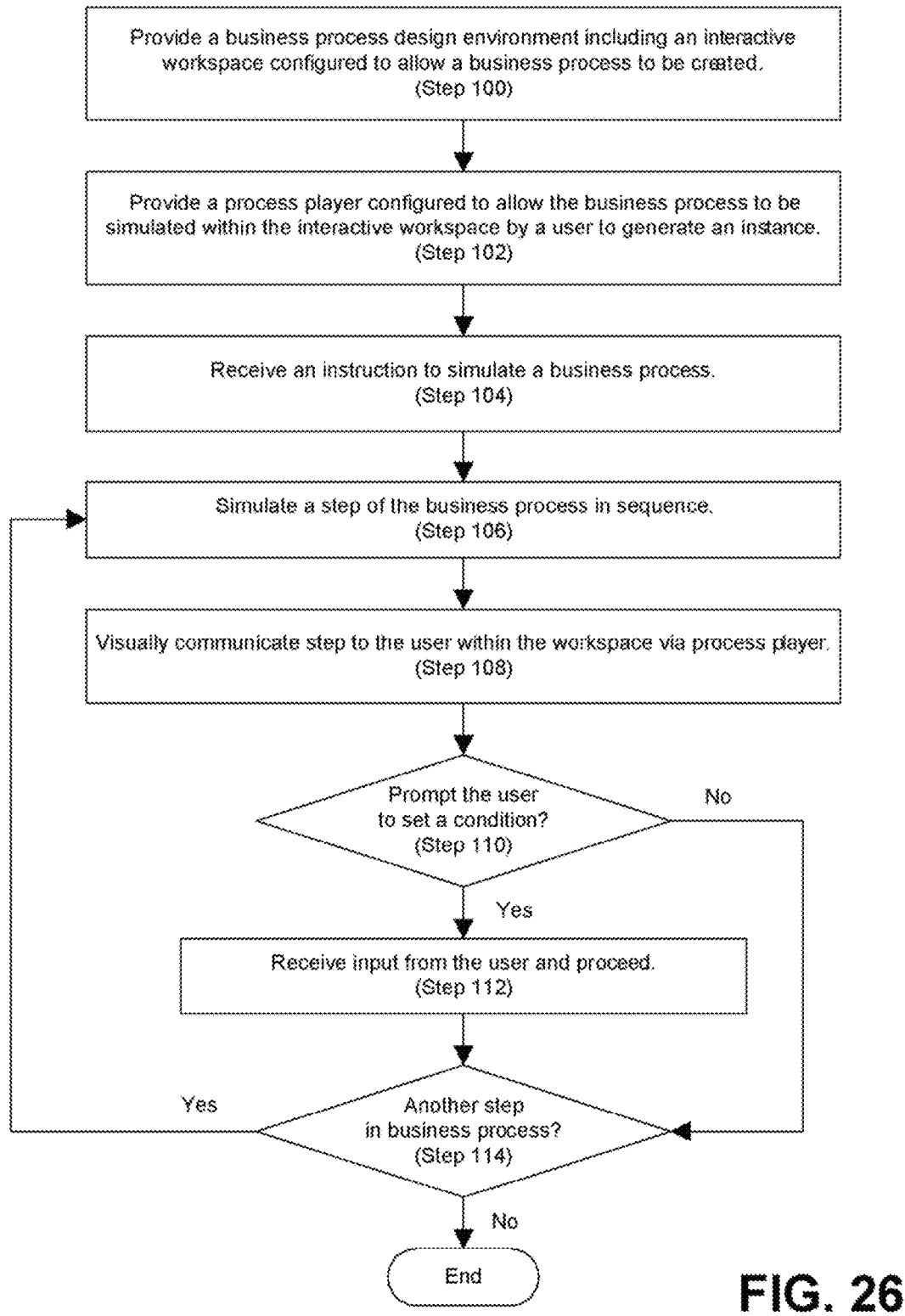
FIG. 26 is a flowchart for a method for simulating a business process, in accordance with an embodiment.

FIG. 26 is a flowchart for a method for simulating a business process, in accordance with an embodiment. A business process design environment including an interactive workspace configured to allow a business process to be created is provided to a user, such as a process analyst (Step 100). A process player configured to allow the business process to be simulated within the interactive workspace by the user to generate an instance is provided to the user (Step 102). An instruction to simulate a business process can be received by the user, for example when a business process is created or as the business process is created (Step 104). The process player can begin to simulate the steps of the business process in sequence (Step 106), visually communicating each step to the user within the workspace via the process player (Step 108). For example, highlighting can be rendered around flow arrows and flow objects of the business process. One or more steps of the business process can require participation by an actor. For such steps, the process player can prompt the user to set a condition (Step 110). Setting a condition can include one or more responses to roles and/or activities. For example, the user can be prompted to select a user from a list of members belonging to a role, then be prompted to answer a query, make a selection from a list, and/or provide information. Once the process player receives input from the user, the process player proceeds to simulate the step and move to the next process step (Step 112). If there is a successive step, the step is simulated (Step 114). When there are no more steps, the business process is complete. In an embodiment, an instance is generated during the simulation. The instance can collect performance data and provide replayability of the simulation, for example in a test environment.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system operable on one or more microprocessors for composing business processes, the system comprising:
    a business process design environment for creating and modifying a definition of a business process;
    a graphical user interface (GUI) for accessing the business process design environment to create and modify the definition of the business process;
    a first display page of the GUI displaying a plurality of graphical elements that each represent an activity of the business process and that are connected together in order of execution to create a flow that defines the business process, wherein at least one of the graphical elements is selectably assigned to one of a plurality of different user roles during a simulation of the business process, each role requiring different action on a part of an associated user acting as a participant during the simulation;
    a second display page of the GUI displaying lists of business processes, instances, and organizational structures related to business processes; and
    a process player that is connected with the business process design environment through an application programming interface (API) and initialized by each of:
        receiving selection of an icon for the process player displayed in the first display page of the GUI to generate a third display page of the GUI that displays a simulator for the business process displayed in the first display page, receiving selection of a business process from the lists in the second display page of the GUI to generate the third display page of the GUI that displays a simulator for the selected business process, and receiving selection of an instance from the lists in the second display page of the GUI to generate the third display page of the GUI that displays a replay of the selected instance including execution of each activity of the flow as previously simulated using visual changes in the graphical elements and connections between the graphical elements, wherein upon receiving an instruction to simulate the business process, the process player is configured to dynamically display, within the third display page of the GUI, execution of each activity of the flow using visual changes in the graphical elements and connections between the graphical elements, wherein the process player is configured to prompt setting a condition during a simulation at each activity of the business process where a participant is designed to be engaged, wherein the process player is configured to simulate the business process multiple times to generate multiple instances.

2. The system of claim 1, wherein multiple different business processes are accessible from the business process design environment.

3. The system of claim 1, wherein the business process design environment provides access by the process player, to the business process design environment, through an application programming interface (API) that enables one or more instances of the business process to be run within the process player to simulate the business process.

4. The system of claim 1, wherein the condition is settable by one or both of selecting an option from a menu and entering information into a form.

5. The system of claim 1, wherein the process player is made accessible via an icon on a project home page of the business process design environment associated with a creator of one or more business processes and upon selection allows selection of a business process from the one or more business processes to be simulated.

6. The system of claim 1, wherein the condition to be set is which of a plurality of participants is to be simulated engaging in the activity.

7. The system of claim 1, wherein a form required to complete the activity within the business process is simulated by the process player for completion by the associated user.

8. The system of claim 1, wherein the process player is startable, pausable, and restartable at any activity within a process instance during initial simulation of the process instance and during playback of the simulated process instance.

9. The system of claim 1, wherein the process player prompts the associated user to set a condition during the simulation at a point in the business process where a participant is designed to be engaged with the business process.

10. A method for composing a business process, comprising:
providing a business process design environment operating on one or more microprocessors, the business process design environment creating and modifying a definition of a business process;

providing a graphical user interface (GUI) operating on one or more microprocessors, the GUI accessing the business process design environment to create and modify the definition of the business process; and providing a first display page of the GUI that displays a plurality of graphical elements that each represent an activity of the business process and that are connected together in order of execution to create a flow that defines the business process, wherein at least one of the graphical elements is selectably assigned to one of a plurality of different user roles during a simulation of the business process, each role requiring different action on a part of an associated user acting as a participant during the simulation;

providing a second display page of the GUI displaying lists of business processes, instances, and organizational structures related to business processes; and providing a process player that is connected with the business process design environment through an application programming interface (API) and initialized by each of
receiving selection of an icon for the process player displayed in the first display page of the GUI to generate a third display page of the GUI that displays a simulator for the business process displayed in the first display page, receiving selection of a business process from the lists in the second display page of the GUI to generate the third display page of the GUI that displays a simulator for the selected business process, and receiving selection of an instance from the lists in the second display page of the GUI to generate the third display page of the GUI that displays a replay of the selected instance including execution of each activity of the flow as previously simulated using visual changes in the graphical elements and connections between the graphical elements, wherein upon receiving an instruction to simulate the business process, dynamically displaying within the third display page of the GUI execution of each activity of the flow using visual changes in the graphical elements and connections between the graphical elements, wherein the process player is configured to prompt setting a condition during a simulation at each activity of the business process where a participant is designed to be engaged, wherein the process player is configured to simulate the business process multiple times to generate multiple instances.

11. The method of claim 10, further comprising:
receiving, from a developer, a plurality of graphical elements in the interactive workspace so that a business process is created;
wherein one or more roles are assigned to one or more of the graphical elements, the one or more roles requiring action on the part of a participant.

12. The method of claim 10, further comprising:
generating and storing an instance based on the simulation of the business process.

13. The method of claim 12, further comprising:
prompting, via the process player, the associated user to set a condition during the simulation at a point in the business process where a participant is designed to be engaged with the business process.

14. The method of claim 10, wherein the business process design environment provides access by the process player, to the business process design environment, through an application programming interface (API) that enables the one or more instances of the business process to be run within the process player.

15. A non-transitory computer readable storage medium, including instructions stored thereon which when read and executed by one or more computers cause the one or more computers to perform steps comprising:
provulating a business process design environment for creating and modifying a definition of a business process;
providing a graphical user interface (GUI) for accessing the business process design environment to create and modify the definition of the business process; and
providing a first display page of the GUI that displays a plurality of graphical elements that each represent an activity of the business process and that are connected together in order of execution to create a flow that defines the business process;
wherein at least one of the graphical elements is selectably assigned to one of a plurality of different roles during a simulation of the business process, each role requiring different action on a part of an associated user acting as a participant during the simulation;
providing a second display page of the GUI displaying lists of business processes, instances, and organizational structures related to business processes; and
providing a process player that is connected with the business process design environment through an application programming interface (API) and initialized by each of
receiving selection of an icon for the process player displayed in the first display page of the GUI to generate a third display page of the GUI that displays a simulator for the business process displayed in the first display page,
receiving selection of a business process from the lists in the second display page of the GUI to generate the third display page of the GUI that displays a simulator for the selected business process, and
receiving selection of an instance from the lists in the second display page of the GUI to generate the third display page of the GUI that displays a replay of the selected instance including execution of each activity of the flow as previously simulated using visual changes in the graphical elements and connections between the graphical elements,
wherein upon receiving from an instruction to simulate the business process, dynamically displaying within the third display page of the GUI execution of each activity of the flow using visual changes in the graphical elements and connections between the graphical elements,
wherein the process player is configured to prompt setting a condition during a simulation at each activity of the business process where a participant is designed to be engaged,
wherein the process player is configured to simulate the business process multiple times to generate multiple instances.

16. The non-transitory computer readable storage medium of claim 15, wherein the instructions, when read and executed by the one or more computers cause the one or more computers to perform the further steps comprising:
receiving, from a developer, a plurality of graphical elements in the interactive workspace so that a business process is created;
wherein one or more roles are assigned to one or more of the graphical elements, the one or more roles requiring action on the part of a participant.

17. The non-transitory computer readable storage medium of claim 15, wherein the instructions, when read and executed by the one or more computers cause the one or more computers to perform further steps comprising:
generating and storing an instance based on the simulation of the business process.

18. The non-transitory computer readable storage medium of claim 17, wherein the instructions, when read and executed by the one or more computers cause the one or more computers to perform further steps comprising:
prompting, via the process player, the associated user to set a condition during the simulation at a point in the business process where a participant is designed to be engaged with the business process.

19. The non-transitory computer readable storage medium of claim 15, wherein the instructions, when read and executed by the one or more computers cause the one or more computers to perform further steps comprising:
the business process design environment providing access by the process player, to the business process design environment, through an application program interface that enables the one or more instances of the business process to be run within the process player.

* * * * *

UNITED STATES PATENT AND TRADEMARK OFFICE
CERTIFICATE OF CORRECTION

PATENT NO.         : 10,380,526 B2
APPLICATION NO.    : 14/184544
DATED              : August 13, 2019
INVENTOR(S)        : Damonte et al.

Page 1 of 1

It is certified that error appears in the above-identified patent and that said Letters Patent is hereby corrected as shown below:

In the Claims

In Column 16, Line 18, in Claim 16, after "perform" delete "the".

Signed and Sealed this
Fourth Day of August, 2020

Andrei Iancu
*Director of the United States Patent and Trademark Office*